US012571884B2

(12) United States Patent
Gutierrez Barragan et al.

(10) Patent No.: US 12,571,884 B2
(45) Date of Patent: Mar. 10, 2026

(54) SYSTEMS, METHODS, AND MEDIA FOR SINGLE PHOTON DEPTH IMAGING WITH IMPROVED EFFICIENCY USING COMPRESSIVE HISTOGRAMS

(71) Applicant: WISCONSIN ALUMNI RESEARCH FOUNDATION, Madison, WI (US)

(72) Inventors: Felipe Gutierrez Barragan, Alameda, CA (US); Andreas Velten, Madison, WI (US); Mohit Gupta, Madison, WI (US); Atul Ingle, Madison, WI (US); Trevor Seets, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 947 days.

(21) Appl. No.: 17/834,884

(22) Filed: Jun. 7, 2022

(65) Prior Publication Data

US 2023/0393241 A1     Dec. 7, 2023

(51) Int. Cl.
| | |
|---|---|
| *G01S 7/48* | (2006.01) |
| *G01S 7/4863* | (2020.01) |

(Continued)

(52) U.S. Cl.
CPC .......... *G01S 7/4808* (2013.01); *G01S 7/4863* (2013.01); *G01S 7/4865* (2013.01); *G01S 17/10* (2013.01); *G01S 17/89* (2013.01)

(58) Field of Classification Search
USPC ....................................................... 356/5.01
See application file for complete search history.

(56) References Cited

U.S. PATENT DOCUMENTS

| | | | |
|---|---|---|---|
| 2015/0041625 A1* | 2/2015 | Dutton | G01T 1/2985 |
| | | | 341/166 |
| 2020/0264285 A1* | 8/2020 | Ding | G01S 17/10 |

(Continued)

FOREIGN PATENT DOCUMENTS

CN     109901160 A  *  6/2019

OTHER PUBLICATIONS

Gupta et al., What Are Optimal Coding Functions for Time-of-Flight Imaging? ACM Transactions on Graphics, vol. 37, No. 2, Article 13. Publication date: Feb. 2018.

(Continued)

*Primary Examiner* — James R Hulka
(74) *Attorney, Agent, or Firm* — Andrus Intellectual Property Law, LLP

(57)     ABSTRACT

In accordance with some embodiments, systems, methods, and media for single photon depth imaging with improved efficiency using compressive histograms are provided. In some embodiments, the system comprises: a light source; a detector configured to detect arrival of individual photons; a processor programmed to: detect a photon arrival; determine a time bin i of the photon arrival in a range from 1 to N a total number of time bins; update a compressed histogram comprising K stored values representing bins of the compressed histogram based on K values in a code word represented by an $i^{th}$ column of a coding matrix C having dimension K×N, with each column different than each other column, and each column corresponds to a single time bin i; and estimate a depth value based on the K values.

20 Claims, 12 Drawing Sheets

(51) Int. Cl.
    *G01S 7/4865*      (2020.01)
    *G01S 17/10*       (2020.01)
    *G01S 17/89*       (2020.01)

(56)          References Cited

U.S. PATENT DOCUMENTS

| | | | |
|---|---|---|---|
| 2022/0043128 A1* | 2/2022 | Pacala | G01S 17/89 |
| 2022/0130060 A1* | 4/2022 | Aßmann | G01S 7/483 |
| 2022/0236387 A1* | 7/2022 | Stoppa | G01S 17/894 |
| 2025/0035750 A1* | 1/2025 | Gutierrez Barragan | G01S 7/4863 |

OTHER PUBLICATIONS

Gutierrez-Barragan et al., Practical Coding Function Design for Time-of-Flight Imaging, CVPR (2019).
Liu et al., Phasor field diffraction based reconstruction for fast non-line-of-sight imaging systems, Nature Communications (2020).
Nam et al., (2020) Real-time Non-line-of-Sight imaging of dynamic scenes, arXiv:2010.12737v1 [cs.CV].
Poisson et al., Luminance-Depth Reconstruction From Compressed Time-of-Flight Histograms, IEEE Transactions on Computational Imaging, vol. 8, 2022.
Sheehan et al., A Sketching Framework for Reduced Data Transfer in Photon Counting Lidar, IEEE Transactions on Computational Imaging, vol. 7, 2021.
Sheehan et al., Surface Dectection for Sketched Single Photon Lidar, arXiv:2015.06920v1 [eess.SP] (2021).
Tachella et al., Sketched RT3D: How to Reconstruct Billions of Photons Per Second, arZiv:2203.00952v1 [eess.IV] (2022).

* cited by examiner

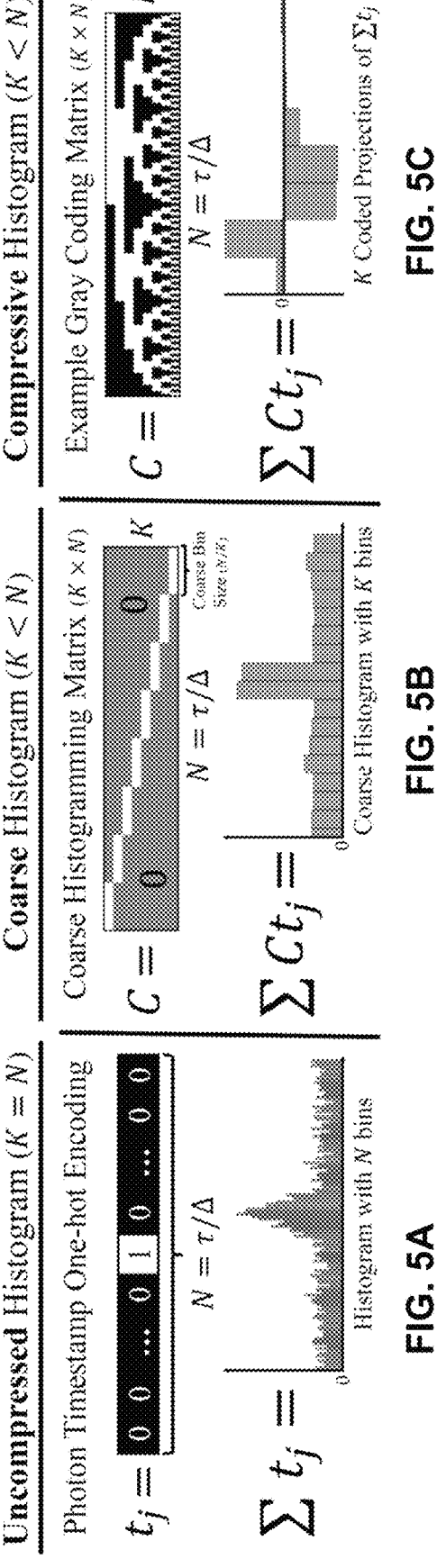

Uncompressed Histogram ($K = N$)

Photon Timestamp One-hot Encoding $$t_j = [\,0\;\cdots\;0\;\;1\;\;0\;\cdots\;0\;\;0\,]$$

$N = \tau/\Delta$ $$\sum t_j =$$

Histogram with $N$ bins

FIG. 5A

Coarse Histogram ($K < N$)

Coarse Histogramming Matrix ($K \times N$)

$$C = \begin{bmatrix} 0 \\ \vdots \\ 0 \end{bmatrix}$$

$N = \tau/\Delta$   $K$

Coarse Bin Size ($N/K$)

$$\sum Ct_j =$$

Coarse Histogram with $K$ bins

FIG. 5B

Compressive Histogram ($K < N$)

Example Gray Coding Matrix ($K \times N$)

$$C =$$

$N = \tau/\Delta$   $K$ $$\sum Ct_j =$$

$K$ Coded Projections of $\sum t_j$

SYSTEMS, METHODS, AND MEDIA FOR SINGLE PHOTON DEPTH IMAGING WITH IMPROVED EFFICIENCY USING COMPRESSIVE HISTOGRAMS

STATEMENT REGARDING FEDERALLY SPONSORED RESEARCH

This invention was made with government support under 1846884 and 1943149 awarded by the National Science Foundation and under DE-NA0003921 awarded by the US Department of Energy. The government has certain rights in the invention.

CROSS-REFERENCE TO RELATED APPLICATIONS

N/A

BACKGROUND

Detectors that are capable of detecting the arrival time of an individual photon, such as single-photon avalanche diodes (SPADs), can facilitate active vision applications in which a light source is used to interrogate a scene. For example, such single-photon detectors have proposed for use with fluorescence lifetime-imaging microscopy (FLIM), non-line-of-sight (NLOS) imaging, transient imaging, and LiDAR systems. The combination of high sensitivity and high timing resolution has the potential to improve performance of such systems in demanding imaging scenarios, such as in systems having a limited power budget. For example, single-photon detectors can play a role in realizing effective long-range LiDAR for automotive applications (e.g., as sensors for autonomous vehicles) in which a power budget is limited and/or in which a signal strength of the light source is limited due to safety concerns.

FIG. 1 shows an example of a SPAD-based pulsed LiDAR system (sometimes referred to by other names such as Geiger-mode LiDAR and Single Photon LiDAR). The example shown in FIG. 1 includes a laser configured to send out light pulses periodically, and a SPAD that records the arrival time of the first detected photon in each laser period. Note that the first detected photon is not necessarily the first photon that is incident on the SPAD, as some photons that are incident will not be detected (the proportion of incident photons detected is sometimes referred to as the quantum efficiency of the detector), and some detections result from noise rather than an incident photon.

In such systems, the first photon detection times in each laser cycle can be collected and used to generate a histogram of the time-of-arrival of the photons that represents the distribution of detections. For example, as described below in connection with FIG. 2, a histogram representing arrival times of photons can be generated. If the incident flux level is within an acceptable range, the histogram can be expected to approximate a scaled version of the received temporal waveform of the reflected laser pulses. In such circumstances, the counts represented by the histogram can be used to estimate scene depths and reflectivity based on the location and height of a local maxima in the data represented by the histogram.

However, SPAD-based systems can generate very large amounts of data. For example, consider a megapixel SPAD-based 3D camera. For short range indoor applications (e.g., up to tens of meters), a millimeter depth resolution would be desirable. For longer range outdoor applications (e.g., hundreds of meters), centimeter level depth resolution would be desirable. Assuming state-of-the-art sub-bin processing techniques, this corresponds to histograms with thousands of bins per pixel, which would require reading out thousands of values per pixel in order to generate a depth for each pixel. Additionally, the rate at which such histograms can be generated can vary from tens of frames per second (fps) for low speed applications (e.g., land surveying) to hundreds of fps for high speed applications (e.g., an automotive application where objects may be moving at high speeds). Even a conservative estimate of a 30 fps megapixel camera leads to a large datarate of $10^6$ pixels/frame×1000 bins/pixel×2 bytes/bin×30 fps=60 GB/sec.

Coarse in-pixel histogramming has been proposed to reduce data rates in SPAD-based 3D cameras. Despite the low time resolution in coarse histograms, it is possible to achieve relatively high depth resolution by using wide pulses, pulse dithering, or with coarse-to-fine histogram architectures. However, as described below, coarse histogramming is a sub-optimal strategy.

Accordingly, systems, methods, and media for single photon depth imaging with improved efficiency using compressive histograms are desirable.

SUMMARY

In accordance with some embodiments of the disclosed subject matter, systems, methods, and media for single photon depth imaging with improved efficiency using compressive histograms are provided.

In accordance with some embodiments of the disclosed subject matter, a system for determining depths is provided, the system comprising: a light source; a detector configured to detect arrival of individual photons; at least one processor that is programmed to: (a) detect, based on a signal from the detector, a photon arrival; (b) determine a time bin t associated with the photon arrival, wherein the time bin is in a range from 1 to N where N is a total number of time bins; (c) update a compressed histogram comprising K stored values representing bins of the compressed histogram based on K values in a code word represented by an $i^{th}$ column of a coding matrix C having dimension K×N, wherein each column of the coding matrix is different than each other column of the coding matrix, and each column corresponds to a single time bin i; and (d) estimate a depth value based on the K values.

In some embodiments, the detector comprises a single photon avalanche diode (SPAD).

In some embodiments, the coding matrix is a Gray coding matrix.

In some embodiments, the Gray coding matrix is a binary Gray coding matrix.

In some embodiments, the coding matrix is a Gray-based Fourier coding matrix.

In some embodiments, the coding matrix is a Fourier-based Gray coding matrix.

In some embodiments, the at least one processor is further programmed to: estimate the depth value using the following:

$$t_z \propto \operatorname*{argmax}_{i} \frac{C_{:,i}^h - \operatorname{mean}(C_{:,i}^h)}{\left\| C_{:,i}^h - \operatorname{mean}(C_{:,i}^h) \right\|} \cdot \frac{\hat{B} - \operatorname{mean}(\hat{B})}{\left\| \hat{B} - \operatorname{mean}(\hat{B}) \right\|}$$

where $t_z$ is a time-of-flight corresponding to the depth value, $C_{:,i}^h$ is the $i^{th}$ column of $C^h$, and $C^h$ is the coding matrix C with each row convolved with an impulse response function h of the system used to detect the photon at (i), and $\hat{B}$ is the compressed histogram.

In some embodiments, (a) to (c) are performed by circuitry that is implemented on the same chip as the detector.

In some embodiments, the system further comprises an image sensor comprising an array including a plurality of detectors configured to detect arrival of individual photons, including the detector, wherein the at least one processor is further programmed to: perform (a) to (d) for each of the plurality of detectors.

In some embodiments, the system further comprises an image sensor comprising an array including a first plurality of detectors in a first area and a second plurality of detectors in a second area, each of the first plurality of detectors and the second plurality of detectors configured to detect arrival of individual photons, including the detector, wherein the at least one processor is further programmed to: perform (a) to (d) for each of the first plurality of detectors; and perform (a) to (d) for each of the second plurality of detectors using a second coding matrix $C_1$ having a number of rows $K_1 > K$.

In some embodiments, the photon arrival is detected during a first frame, and the at least one processor is further programmed to: repeat (a) to (d) for a second frame using a second coding matrix $C_1$ having a number of rows $K_1 > K$.

In some embodiments, N is at least 1024, and K is no greater than 64.

In accordance with some embodiments of the disclosed subject matter, a method for determining a depth in a scene is provided, the method comprising: (a) detecting, based on a signal from a detector configured to detect arrival of individual photons, a photon arrival; (b) determining a time bin t associated with the photon arrival, wherein the time bin is in a range from 1 to N where N is a total number of time bins; (c) updating a compressed histogram comprising K stored values representing bins of the compressed histogram based on K values in a code word represented by an $i^{th}$ column of a coding matrix C having dimension K×N, wherein each column of the coding matrix is different than each other column of the coding matrix, and each column corresponds to a single time bin i; and (d) estimating a depth value based on the K values.

In accordance with some embodiments of the disclosed subject matter, a non-transitory computer readable medium containing computer executable instructions that, when executed by a processor, cause the processor to perform a method for determining a depth in a scene is provided, the method comprising: (a) detecting, based on a signal from a detector configured to detect arrival of individual photons, a photon arrival; (b) determining a time bin i associated with the photon arrival, wherein the time bin is in a range from 1 to N where N is a total number of time bins; (c) updating a compressed histogram comprising K stored values representing bins of the compressed histogram based on K values in a code word represented by an $i^{th}$ column of a coding matrix C having dimension K×N, wherein each column of the coding matrix is different than each other column of the coding matrix, and each column corresponds to a single time bin i; and (d) estimating a depth value based on the K values.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIG. 5A shows an example of a full-resolution histogram with a bin width that matches the timestamp resolution formed as the sum of timestamps represented as one-hot encoded vectors.

FIG. 5B shows an example of a naïve coarse histogram formed by performing operations equivalent to multiplying each timestamp with a down-sampling matrix to group timestamps into coarser bins, reducing the size of the histogram at the cost of resolution.

FIG. 5C shows an example of a compressive histogram generated using mechanisms described herein by performing operations equivalent to multiplying each timestamp with a coding matrix and adding the results up as each photon timestamp is received in accordance with some embodiments of the disclosed subject matter.

DETAILED DESCRIPTION

Figure 1:
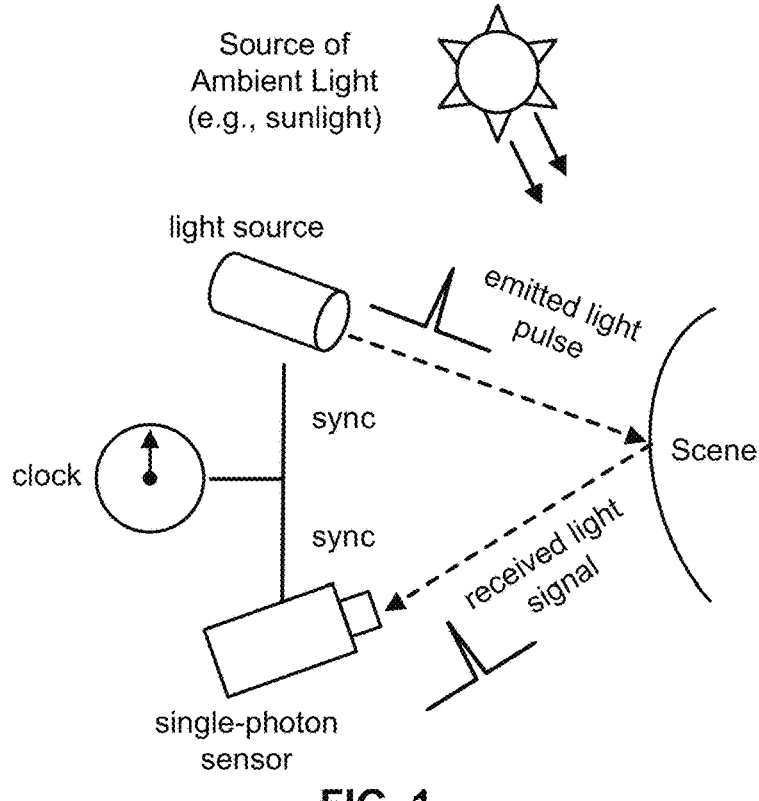
FIG. 1 shows an example of a single photon avalanche diode (SPAD)-based pulsed LiDAR system.

In accordance with various embodiments, mechanisms (which can, for example, include systems, methods, and media) for single photon depth imaging with improved efficiency using compressive histograms are provided.

In some embodiments, mechanisms described herein can be used to generate compressive histograms that can improve the efficiency of single photon depth imaging systems, for example, by reducing the per-pixel output data rate at a particular depth resolution and frame rate.

Single-photon cameras (SPC) are an emerging sensor technology with ultra-high sensitivity down to individual photons. In addition to their extreme sensitivity, SPCs based on single-photon avalanche diodes (SPADs) can also record photon-arrival timestamps with extremely high (sub-nano-second) time resolution. Moreover, SPAD-based SPCs are compatible with complementary metal-oxide semiconductor (CMOS) photolithography processes which can facilitate fabrication of kilo-to-mega-pixel resolution SPAD arrays at relatively low costs. Due to these characteristics, SPAD-based SPCs are gaining popularity in various imaging applications including 3D imaging, passive low-light imaging, HDR imaging, non-line-of-sight (NLOS) imaging, fluorescence lifetime imaging (FLIM) microscopy, and diffuse optical tomography.

Unlike a conventional camera pixel that outputs a single intensity value integrated over micro-to-millisecond timescales, a SPAD pixel generates an electrical pulse for each photon detection event. A time-to-digital conversion circuit converts each pulse into a timestamp recording the time-of-arrival of each photon. Under normal illumination conditions, a SPAD pixel can generate millions of photon timestamps per second. The photon timestamps are often captured with respect to a periodic synchronization signal generated by a pulsed laser source. To make this large volume of timestamp data more manageable, SPAD-based SPCs can build a timing histogram on-chip instead of transferring the raw photon timestamps to the host computer. The histogram can record the number of photons as a function of the time delay with respect to the synchronization pulse.

In some embodiments, mechanisms described herein can be used to implement bandwidth-efficient acquisition strategies that are sometimes referred to herein as compressive single-photon histograms (C-SPH). In some embodiments, rather than capturing the full timing histogram in each pixel, a C-SPH can be constructed by mapping the time bins of the full histogram onto multiple "compressive bins" though an encoding process.

As described below, in some embodiments, mechanisms described herein can utilize a family of compressive encoders that are linear, and can be represented as a simple matrix operation. Such linear compressive encoders can be implemented efficiently using operations equivalent to multiply-add operations that can be computed on-the-fly (e.g., as each photon arrives), without the need to store large arrays of photon timestamps on-chip. In some embodiments, using C-SPHs can decouple the dependence of output data rate on the desired depth resolution. For example, while a full histogram requires more time bins to achieve higher depth resolution, C-SPHs generated using mechanisms described herein can represent a higher depth resolution using a similar (e.g., almost the same) number of compressive bins.

As described below, while coarse histogramming can be considered a form of C-SPH, coarse histogramming is sub-optimal compared to other compressive histogramming strategies. Other data reduction strategies, such as motion-driven operation or multi-photon triggering have been proposed to reduce the amount of data generated by SPADs. Additionally, in the context of scanning-based systems, adaptive sampling methods have been proposed to reduce sampling rates and consequently data transfers. In some embodiments, such techniques can be used in a complementary manner with C-SPHs to further reduce data rates.

Recently, Fourier-domain histograms (FDHs) were proposed for fast NLOS reconstruction non-line-of-sight (NLOS) imaging and for single-photon 3D imaging. FDHs can be generated using mechanisms described herein as one type of C-SPHs that can achieve significant compression over regular histogramming. However, C-SPH strategies that are more efficient than FDH for 3D imaging, and that are also more robust to diffuse indirect reflections commonly found in flash illumination systems are described below.

In some embodiments, mechanisms described herein can use a coding matrix (e.g., a K×N matrix described below in connection with FIGS. 5C, 6A, and 6B) in which each column can be used as a code to encode a photon arrival at a particular time (e.g., corresponding to a particular bin of a full-resolution histogram having N bins) to generate a compressed representation of a full-resolution histogram for a single-photon detector that can be used to determine a time of flight of a light pulse emitted from a co-located source. For example, each column of the coding matrix can correspond to a code word having K elements (e.g., each element within a predetermined range, such as from −1 to 1) that are added to the compressed histogram. At the end of a frame, the values of the compressed histogram can be read out and used to determine a depth for a scene point corresponding to the single-photon detector used to generate the compressed histogram (e.g., using EQ. (6), described below).

FIG. 1 shows an example of a SPAD-based pulsed imaging system (e.g., a LiDAR system, sometimes referred to by other names such as Geiger-mode LiDAR and Single Photon LiDAR, a single photon 3D camera). The example shown in FIG. 1 includes a light source (e.g., a laser) configured to send out light pulses periodically, and a SPAD that records the arrival time of the first detected photon in each laser period, after which it enters a dead time, during which the SPAD is inhibited from detecting any further photons. Note that the first detected photon is not necessarily the first photon that is incident on the SPAD, as some photons that are incident will not be detected (the proportion of incident photons detected is sometimes referred to as the quantum efficiency of the detector), and some detections result from noise rather than an incident photon.

Figure 2:
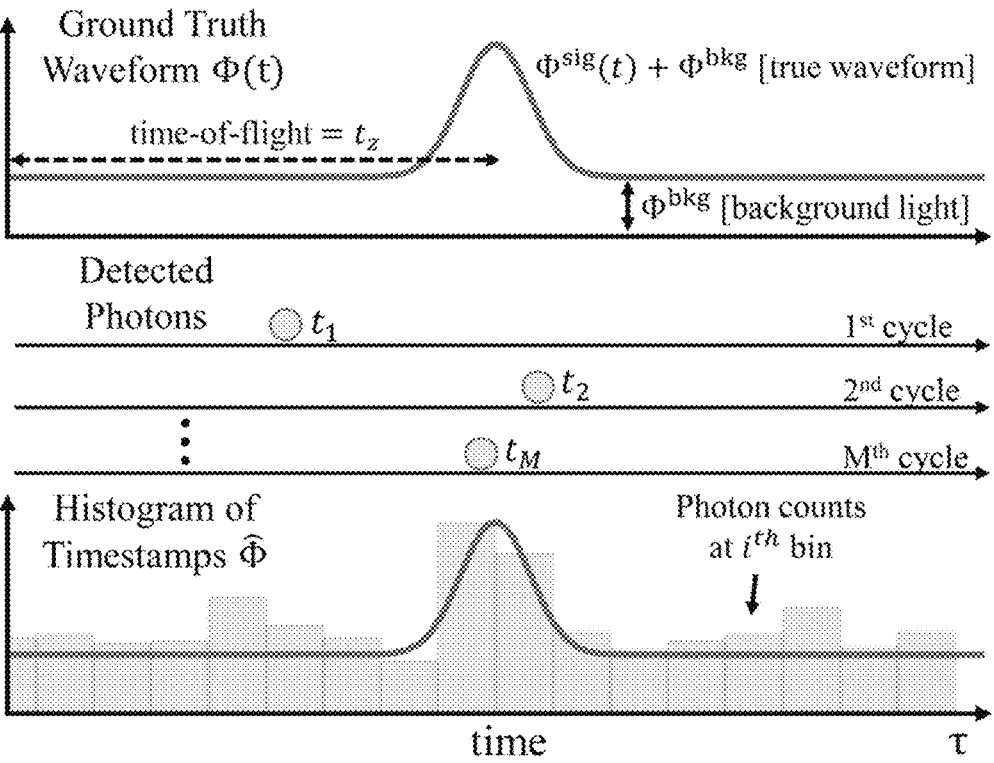
FIG. 2 shows an example of a histogram representing arrival times of photons in a series of cycles with pile-up caused by ambient light.

In such systems, the first photon detection times in each laser cycle can be collected and used to generate a histogram of the time-of-arrival of the photons that represents the distribution of detections. For example, FIG. 2 shows a histogram representing arrival times of photons in a series of cycles with pile-up caused by ambient light. If the incident flux level is sufficiently low, the histogram can be expected to approximate a scaled version of the received temporal waveform of the reflected laser pulses. In such circumstances, the counts represented by the histogram can be used to estimate scene depths and reflectivity based on the location and height of a local maxima in the data represented by the histogram. A SPAD-based 3D camera can estimate distances by building a per-pixel histogram of the detected photons time-of-arrival. The histogram is a discrete approximation of the photon flux waveform incident on the pixel, which encodes distances in the time shift ($t_z$) of the pulse.

Single-photon 3D cameras (and SPAD-based LiDAR systems) can include a SPAD sensor and a periodic pulsed laser that illuminates the scene. Assuming direct-only reflections, the returning photon flux signal that will be captured by a SPAD pixel can be represented as:

$$\Phi(t)=ah(t-t_z)+\Phi^{bkg}=\Phi^{sig}(t)+\Phi^{bkg} \quad (1)$$

where h(t) is the impulse response function (IRF) of the system, which accounts for the pulse waveform and sensor IRF, a represents the returning signal photon flux, $t_z$ is a time shift proportional to distance, and $\Phi^{bkg}$ corresponds to the background photon flux. Although simple, the model represented by EQ. (1) is a valid approximation in a wide variety of active illumination scenarios, in particular, for scanning systems.

SPAD-based 3D cameras can sample $\Phi(t)$ using time correlated single-photon counting (TCSPC). In such a system, the SPAD pixel, once triggered, can start acquiring photons. After detecting one photon, the photon timestamp can be recorded, and the SPAD is inactive for a time period called the dead time (e.g., about 50 nanoseconds (ns)). As shown in FIG. 2, the above process can be repeated for M cycles, and a histogram of the timestamps can be constructed which approximates $\Phi(t)$. If the photons are time-tagged with a resolution, $\Delta$, the mean photon flux at histogram bin i can be represented as:

$$\Phi_i=\Phi^{sig}+\Delta\Phi^{bkg} \quad (2)$$

The vector, $\Phi=\Phi_i)_{i=0}^{N-1}$, is the photon flux waveform histogram, where $N=\tau/\Delta$, and $\tau$ is the timestamp range which often equals the laser pulse repetition period. Here it can be assumed that the SPAD sensor is being operated in asynchronous mode or is capable of multi-event timestamp collection, which can mitigate pile-up distortions, and can guarantee that $\Phi_i$ is an appropriate approximation of (t).

Such a histogram formation process can generate a 3D histogram image, using one histogram per pixel. In emerging megapixel SPAD arrays with picosecond time resolutions, building such a histogram image off-sensor requires transferring thousands of timestamps per-pixel, leading to TB/s data rates. Alternatively, building in-pixel histograms would still require transferring the 3D data volume off-sensor for processing, which still results in impractical data rates of tens of GB/s (e.g., due to the use of hundreds to thousands of bins to generate the histogram). Accordingly, data bandwidth is an important practical challenge for emerging single-photon 3D Cameras.

Figures 3A, 3B:
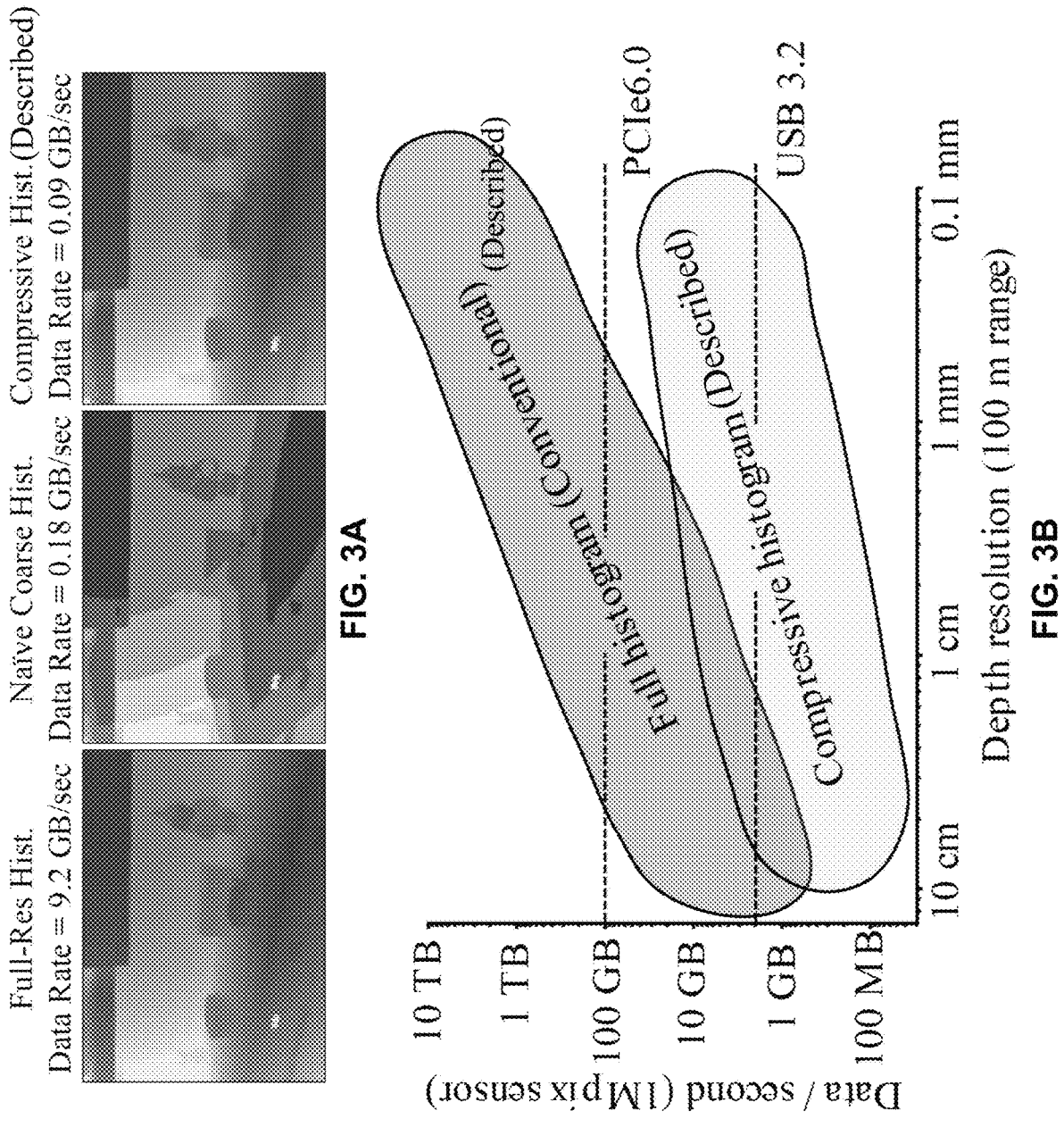
FIG. 3A shows an example of depth maps generated using a full-resolution histogram, a naïve coarse histogram, and a compressive histogram generated in accordance with some embodiments of the disclosed subject matter.
FIG. 3B shows an example of data generated by a one megapixel image sensor implemented using single-photon sensors using a full-resolution histogram and a compressive histogram generated in accordance with some embodiments of the disclosed subject matter at various depth resolutions.

FIG. 3A shows an example of depth maps generated using a full-resolution histogram, a naïve coarse histogram, and a compressive histogram generated in accordance with some embodiments of the disclosed subject matter, and FIG. 3B shows an example of data generated by a one megapixel image sensor implemented using single-photon sensors using a full-resolution histogram and a compressive histogram generated in accordance with some embodiments of the disclosed subject matter at various depth resolutions.

Example depth maps are shown that were generated using conventional (full histogram) capture, coarse resolution capture, and using a compressive histogram generated using mechanisms described herein. As shown in FIG. 3A, the compressive histogram generates 100× lower data than the full resolution histogram, yet generates depth maps that are visually indistinguishable from the conventional techniques. The compressive histogram also generated half the data that was generated using the naïve coarse histogram while generated depth maps with much better resolution. As shown in FIG. 3B, with conventional acquisition schemes, data bandwidth requirements scale linearly with the desired depth resolution. The amount of data generated by conventional full histogram capture techniques varies linearly with the desired depth resolution and exceeds the bandwidth of state-of-the-art data-transfer busses (e.g., USB and PCIe) by orders of magnitude.

Mechanisms described herein can be used to implement compressive acquisition schemes that do not scale as strongly with depth resolution, keeping the output data rates manageable with existing data transfer standards like USB and PCIe6.0. As shown in FIG. 3B, C-SPHs can reduce the required data rate by 1-2 orders of magnitude compared to the full histogram case.

Figure 4A:
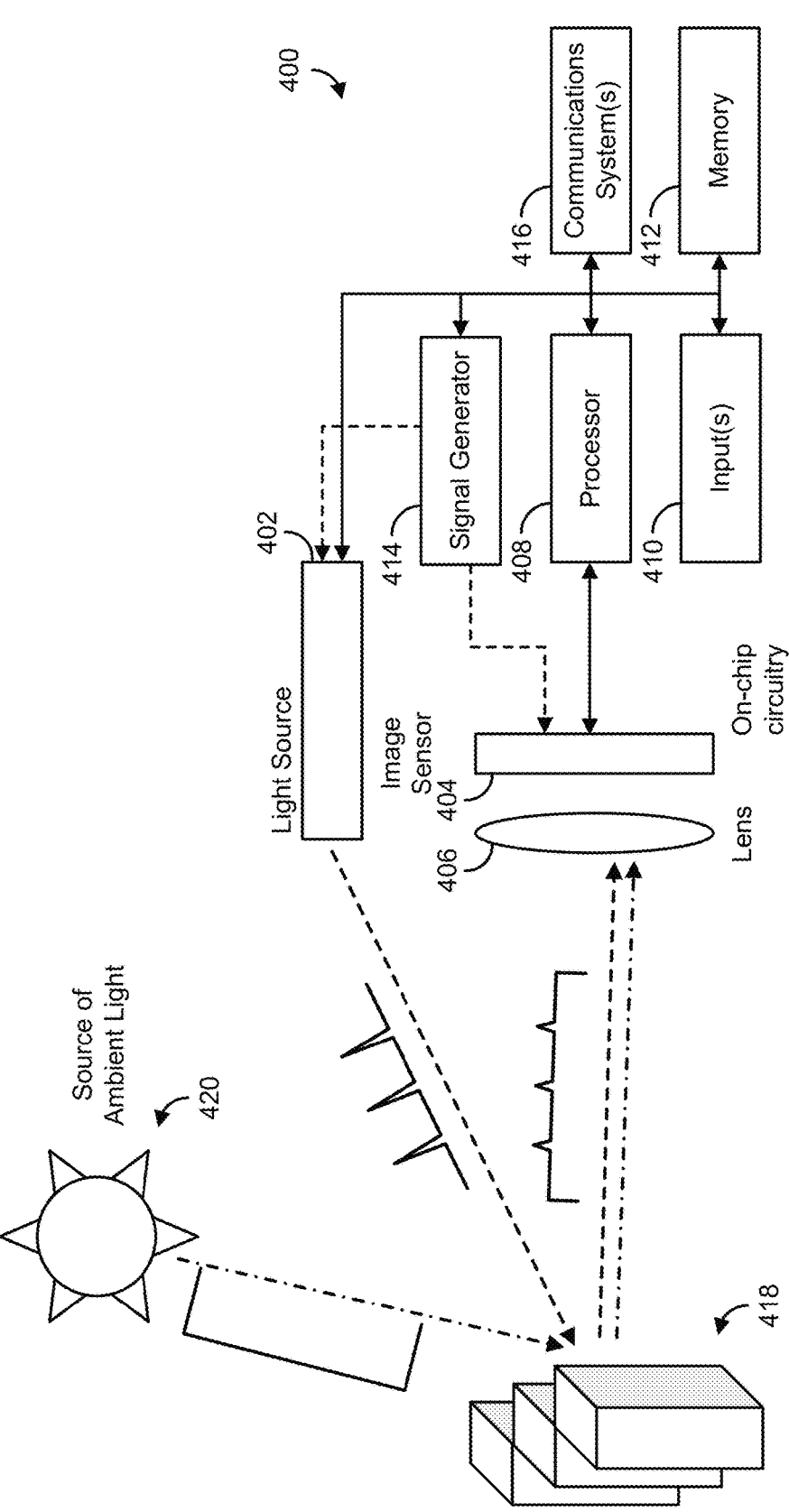
FIG. 4A shows an example of a system for single photon depth imaging with improved efficiency using compressive histograms generated in accordance with some embodiments of the disclosed subject matter.

FIG. 4A shows an example 400 of a system for single photon depth imaging with improved efficiency using compressive histograms in accordance with some embodiments of the disclosed subject matter. As shown, system 400 can include a light source 402; an image sensor 404 (e.g., an area sensor that includes an array of detectors, a single detector, or a line sensor that includes a linear array of detectors); optics 406 (which can include, for example, one or more lenses, one or more attenuation elements such as a filter, a diaphragm, and/or any other suitable optical elements such as a beam splitter, etc.), a processor 408 for controlling operations of system 400 which can include any suitable hardware processor (which can be a central processing unit (CPU), a graphics processing unit (GPU), an accelerate processing unit (APU), a digital signal processor (DSP), a microcontroller (MCU), a field programmable gate array (FPGA), an application-specific integrated circuit (ASIC), etc.) or combination of hardware processors; an input device/display 410 (such as a shutter button, a menu button, a microphone, a touchscreen, a motion sensor, a liquid crystal display, a light emitting diode display, etc., or any suitable combination thereof) for accepting input from a user and/or from the environment, and/or for presenting information (e.g., images, user interfaces, etc.) for consumption by a user; memory 412; a signal generator 414 for generating one or more signals to control operation of light source 402 and/or image sensor 404; a communication system or systems 416 for facilitating communication between system 400 and other devices, such as a smartphone, a wearable computer, a tablet computer, a laptop computer, a personal computer, a server, an embedded computer (e.g., for controlling an autonomous vehicle, robot, etc.), etc., via a communication link, and on-chip processing circuitry 422. In some embodiments, memory 412 can store histogram information, scene depth information, image data, and/or any other suitable data. Memory 412 can include a storage device (e.g., a hard disk, a Blu-ray disc, a Digital Video Disk, RAM, ROM, EEPROM, etc.) for storing a computer program for controlling processor 408. In some embodiments, memory 412 can include instructions for causing processor 408 to execute processes associated with the mechanisms described herein, such as a process described below in connection with FIG. 8.

In some embodiments, light source 402 can be any suitable light source that can be configured to emit modulated light (e.g., as a stream of pulses, having a shape described below in connection with FIG. 7) toward a scene 418 illuminated by an ambient light source 420 in accordance with a signal received from signal generator 416. For example, light source 402 can include one or more laser diodes, one or more lasers, one or more light emitting diodes, and/or any other suitable light source. In some embodiments, light source 402 can emit light at any suitable wavelength. For example, light source 402 can emit ultraviolet light, visible light, near-infrared light, infrared light, etc. In a more particular example, light source 402 can be a coherent light source that emits light in the green portion of the visible spectrum (e.g., centered at 532 nm). In another more particular example, light source 402 can be a coherent light source that emits light in the infrared portion of the spectrum (e.g., centered at a wavelength in the near-infrared such as 1060 nm or 1064 nm).

In some embodiments, image sensor 404 can be an image sensor that is implemented at least in part using one or more SPAD detectors (sometimes referred to as a Geiger-mode avalanche diode) and/or one or more other detectors that are configured to detect the arrival time of individual photons. In some embodiments, one or more elements of image sensor 404 can be configured to generate data indicative of the arrival time of photons from the scene via optics 406. For example, in some embodiments, image sensor 404 can be a single SPAD detector. As another example, image sensor 404 can be an array of multiple SPAD detectors. As yet another example, image sensor 404 can be a hybrid array including one or more SPAD detectors and one or more conventional light detectors (e.g., CMOS-based pixels). As still another example, image sensor 404 can be multiple image sensors, such as a first image sensor that includes one or more SPAD detectors that is used to generate depth information and a second image sensor that includes one or more conventional pixels that is used to generate ambient brightness information and/or image data. In such an example, optical components can be included in optics 406 (e.g., multiple lenses, a beam splitter, etc.) to direct a portion of incoming light toward the SPAD-based image sensor and another portion toward the conventional image sensor that is used for light metering.

In some embodiments, image sensor 404 can include on-chip processing circuitry that can be used to generate compressive histograms, which can be output to processor 408, which can facilitate a reduction in the volume of data transferred from image sensor 404. For example, single-photon detectors of image sensor 404 can be associated with circuitry that implements at least a portion of process 800, described below. As a particular example, single-photon detectors of image sensor 404 can be associated with circuitry that is configured to determine which bin of a full resolution histogram (e.g., which column of a coding matrix) is associated with a time at which a photon is detected.

As another more particular example, single-photon detectors of image sensor 404 can be associated with accumulators that are configured to update and store values for bins of the compressive histogram based on values of the code in a coding matrix associated with a time at which a photon is detected. In some embodiments, the accumulators can be implemented using any suitable technique or combination of techniques. For example, for a fully binary coding matrix (e.g., in which each element represents a 1 or a −1), the accumulators can be configured to increment or decrement by 1 from a current value (e.g., using a register configured to store a two's complement representation of an integer). As another example, for a coding matrix configured to use floating point values (e.g., Gray-based Fourier, Truncated Fourier, etc.), the accumulators can be configured to add a (positive or negative) multi bit value (e.g., a fixed point number, a floating point number, an integer, etc.). As a more particular example, for a coding matrix configured to use fixed point values, the accumulators can be configured to add a (positive or negative) multi bit fixed point value (e.g., an 8 bit value, a 10 bit value, etc.). In some embodiments, a coding matrix can be configured to store values in a range of $[-1, 1]$ using fixed point values that each represent a value in the range (e.g., using only positive binary values, using a two's complement representation, etc.). In such an example, the value from the coding matrix can be converted into a floating point or fixed point representation prior to being added to the accumulator, or values stored in an accumulator can be converted to a floating point or fixed point representation prior to being used to calculate a depth value. In a more particular example, values in a coding matrix can be represented using a representation of a particular bit depth (e.g., using 8 bits, using 10 bits, using 12 bits, using two bytes, etc.), which can create a quantized representation of the value in the coding matrix (e.g., in an 8 bit quantized representation 0000 0000 can represent −1, 1111 1111 can represent 1, 0000 0001 can represent −0.9921875, etc.; in an 8 bit two's complement quantized representation 0000 0000 can represent 0, 1000 0000 can represent −1, 0111 1111 can represent 1, 1000 0001 can represent −0.9921875, etc.). In such an example, the values in the coding matrix can be represented using the closest value available in the quantized representation. In some embodiments, the accumulators can be implemented using various different hardware implementations.

As yet another more particular example, single-photon detectors of image sensor 404 can be associated with components (e.g., memory, logic, etc.) configured to store a representation of a coding matrix. In some embodiments, a single representation of a coding matrix can be stored in memory, and can be accessed by circuitry associated with multiple single-photon detectors. For example, a single representation of a coding matrix can be stored in global memory (e.g., memory implemented on image sensor 404), and circuitry associated with each single-photon detector can be configured to retrieve individual columns (e.g., code words) of the coding matrix from the global memory (e.g., in connection with each frame). As another example, a representation of a coding matrix can be stored in multiple local memories (e.g., associated with one or more single-photon detectors), and circuitry associated with each single-photon detector can be configured to retrieve individual columns (e.g., code words) of the coding matrix from the local memory (e.g., in connection with each frame). Such local memory can be shared, for example, among a spatially local neighborhood of single-photon detectors of an array (e.g., among any suitable number of neighboring single-photon detectors, from several to hundreds, thousands, etc.). In such examples, image sensor 404 can be configured to use the representation(s) of the coding matrix or matrices to update a compressive histogram associated with a single-photon detector responsive to detection of a photon.

In some embodiments, different coding matrices can be used in connection with different time periods (e.g., coding matrices can be changed for difference frames) and/or for different areas of the image sensor. For example, during a first time period a coding matrix with K=8 can be used, and during another time period a coding matrix with K=16 can be used. In such an example, the coding matrix can be adjusted based on environmental conditions. For example, as the amount of ambient light increases, a coding matrix with more rows can be used As described below in connection with FIGS. 9A, 9B, and 10, accuracy is generally better for high signal-to-background noise conditions, and as the number of photons detected increases. Thus, in a portion of a scene (or at a time) having low ambient light, a coding matrix with fewer rows can perform well, while in a portion of a scene (or at a time) having higher ambient light coding matrices with more rows may improve performance (but may necessitate a reduction in frame rate to fit within an available data transmission budget). In some such embodiments, multiple coding matrices can be stored in global memory (e.g., a memory implemented on image sensor 404, memory 412), and can be loaded to an appropriate memory for use in generating a compressive histogram (e.g., to a local memory associated with a neighborhood of single-photon detectors when the coding matrix changes on a per neighborhood basis or changes between frames, and/or to a global memory used by all single-photon detectors when the coding matrix changes between frames).

In some embodiments, the on-chip processing circuitry can be implemented using any suitable fabrication techniques. For example, 3D-stacking CMOS techniques can be used to implement circuit components configured to generate a compressive histogram for each single-photon detector.

In some embodiments, system 400 can include additional optics. For example, although optics 406 is shown as a single lens and attenuation element, it can be implemented as a compound lens or combination of lenses. Note that although the mechanisms described herein are generally described as using SPAD-based detectors, this is merely an example of a single photon detector that is configured to record the arrival time of a pixel with a time resolution on the order of picoseconds, and other components can be used in place of SPAD detectors. For example, a photomultiplier tube in Geiger mode can be used to detect single photon arrivals.

In some embodiments, optics 406 can include optics for focusing light received from scene 418, one or more narrow bandpass filters centered around the wavelength of light emitted by light source 402, any other suitable optics, and/or any suitable combination thereof. In some embodiments, a single filter can be used for the entire area of image sensor 404 and/or multiple filters can be used that are each associated with a smaller area of image sensor 104 (e.g., with individual pixels or groups of pixels). Additionally, in some embodiments, optics 406 can include one or more optical components configured to attenuate the input flux (e.g., a neutral density filter, a diaphragm, etc.).

In some embodiments, system 400 can communicate with a remote device over a network using communication system(s) 414 and a communication link. Additionally or alternatively, system 400 can be included as part of another device, such as a smartphone, a tablet computer, a laptop computer, an autonomous vehicle, a robot, etc. Parts of system 400 can be shared with a device within which system 400 is integrated. For example, if system 400 is integrated with an autonomous vehicle, processor 408 can be a processor of the autonomous vehicle and can be used to control operation of system 400.

In some embodiments, system 400 can communicate with any other suitable device, where the other device can be one of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc. For example, the other device can be implemented as a digital camera, security camera, outdoor monitoring system, a smartphone, a wearable computer, a tablet computer, a personal data assistant (PDA), a personal computer, a laptop computer, a multimedia terminal, a game console, a peripheral for a game counsel or any of the above devices, a special purpose device, etc.

Communications by communication system 414 via a communication link can be carried out using any suitable computer network, or any suitable combination of networks, including the Internet, an intranet, a wide-area network (WAN), a local-area network (LAN), a wireless network, a digital subscriber line (DSL) network, a frame relay network, an asynchronous transfer mode (ATM) network, a virtual private network (VPN). The communications link can include any communication links suitable for communicating data between system 100 and another device, such as a network link, a dial-up link, a wireless link, a hard-wired link, any other suitable communication link, or any suitable combination of such links.

It should also be noted that data received through the communication link or any other communication link(s) can be received from any suitable source. In some embodiments, processor 408 can send and receive data through the communication link or any other communication link(s) using, for example, a transmitter, receiver, transmitter/receiver, transceiver, or any other suitable communication device.

Figure 4B:
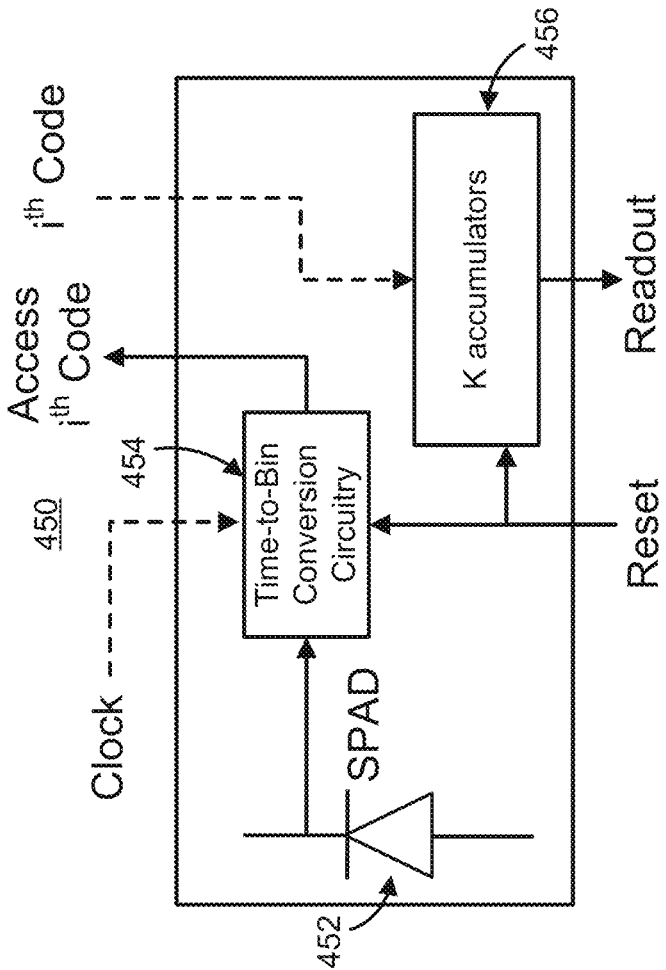
FIG. 4B shows an example of a single photon avalanche diode pixel that can be used to generate a compressive histogram in accordance with some embodiments of the disclosed subject matter.

FIG. 4B shows an example of a single photon avalanche diode (SPAD) pixel 450 that can be used to generate a compressive histogram in accordance with some embodiments of the disclosed subject matter. In some embodiments, SPAD pixel 450 can include a single photon detector 452 (e.g., a SPAD detector, another type of single-photon detector), which can be implemented using CMOS techniques, and can include an active or passive quenching circuit to quench avalanche pulses. Additionally, in some embodiments, SPAD pixel 450 can include time-to-bin conversion circuitry 454 that can be used to determine which bin of a full resolution histogram a detected photon falls into using any suitable technique or combination of techniques. For example, if the detected photon timestamp is $t_i$ and the time resolution of the single-photon detector (and/or time-to-digital converter (TDC)) is $t_{res}$, the bin of the full-resolution histogram (and the column of the coding matrix) can be determined using the expression $$\text{BIN (or COLUMN INDEX)} = \text{floor}\left(\frac{t_i}{t_{res}}\right),$$

where floor is the floor function which gives as output the integer that is less than or equal to $$\frac{t_i}{t_{res}}.$$

In a more particular example, the TDC can be configured to output a value of $\text{ceil}(\log_2 N)$ bits corresponding to the time bin (e.g., if N is 1024, the TDC can output a 10 bit value corresponding to the full-resolution histogram time bin and/or coding matrix column at which the photon was detected), where ceil is the ceiling function which gives as output the integer that is greater than or equal to $$\frac{t_i}{t_{res}}.$$

In some embodiments, time-to-bin conversion circuitry 454 can receive an input from a clock and/or a synchronization signal that can be used to determine a relative timing between when a light pulse was emitted, and when a photon was detected at SPAD 452. This information can be used by time-to-bin conversion circuitry 454 to determine a full-resolution histogram bin to which the received photon corresponds. Additionally, time-to-bin conversion circuitry 454 can generate a value or vector indicative of the $i^{th}$ bin to which the photon corresponds. For example, time-to-bin conversion circuitry 454 can output a binary representation of the identified bin (e.g., using eight bits, ten bits, twelve bits, two bytes, etc. to represent up to several tens of thousands of bins), which can represent the index of the column of the coding matrix to be used to update the accumulators. In a more particular example, time-to-bin conversion circuitry 454 can be implemented using a TDC, which can be rest when the light source is activated. As described above, the TDC can output a binary value that corresponds to the time bin in a full-resolution histogram and the column of the coding matrix (e.g., the code word) that is to be added to the accumulators. As another example, time-to-bin conversion circuitry 454 can output a set of binary values representing a one-hot encoding of the bin (e.g., a 0 can be expressed for each bin, other than the bin associated with the detected photon, for which a 1 can be expressed).

In some embodiments, SPAD pixel 450 can access a stored representation of a coding matrix (e.g., as described below in connection with FIGS. 5B to 6B), and can retrieve the $i^{th}$ code from the coding matrix corresponding to the based on the bin. In some embodiments, values from the $i^{th}$ coding matrix can be provided to a set of K accumulator circuits 456, which can include an accumulator for each of K bins of the compressive histogram. Each value from the $i^{th}$ code can be added to a corresponding accumulator of K accumulators 456, which can update values of the compressive histogram to account for the most recently received photon. As described above, in some embodiments, a representation of a coding matrix can be stored in a globally accessible memory and/or in local memory (e.g., associated with a neighborhood of pixels), and can be accessed by circuitry associated with multiple single-photon detectors to retrieve a code word associated with the timing of a detected photon. Additionally, as described above, the stored representation can be changed (e.g., to a different coding matrix, such as a coding matrix with the same design and more rows, or a coding matrix with a different design and which may include a different number of rows).

In some embodiments, at the end of a frame, K accumulators 456 can be configured to readout the K values of the compressive histogram (e.g., to processor 408). As described above in connection with FIG. 3B, this can dramatically reduce the amount of data read out from image sensor 404 (e.g., by at least an order of magnitude).

FIG. 5A shows an example of a full-resolution histogram with a bin width that matches the timestamp resolution formed as the sum of timestamps represented as one-hot encoded vectors. FIG. 5B shows an example of a naïve coarse histogram formed by performing operations equivalent to multiplying each timestamp with a down-sampling matrix to group timestamps into coarser bins, reducing the size of the histogram at the cost of resolution. FIG. 5C shows an example of a compressive histogram generated using mechanisms described herein by performing operations equivalent to multiplying each timestamp with a coding matrix and adding the results up as each photon timestamp is received in accordance with some embodiments of the disclosed subject matter.

Single-photon timestamp histograms can be generated on-the-fly, as each photon timestamp comes in. FIG. 5A shows how a histogram, with bin widths matching the timestamp resolution ($\Delta$), can be formed as the sum of timestamps represented as one-hot encoded vectors. Transferring such a large histogram for every pixel can be impractical, even if such a histogram can be generated on the image sensor. As shown in FIG. 5B, performing operations equivalent to multiplying each timestamp with a down-sampling matrix to group timestamps into coarser bins can reduce the size of the histogram at the cost of resolution. In some embodiments, mechanisms described herein can create a compressive histogram can be created by performing operations that are equivalent to multiplying each timestamp with a coding matrix to generate a code, and adding the resulting codes up as each photon timestamp comes in. As described herein, a well-designed coding matrix can efficiently encode the location of the peak of the full-resolution histogram from which distance can be computed.

In general, a full-resolution 3D histogram image can be compressed effectively if the entire histogram image were available. However, building and transferring such a histogram image off the sensor is expensive (e.g., the full histogram image is likely to includes at least GBs of data, as described above in connection with FIG. 3B). Mechanisms described herein can be used to generate a compressed histogram without ever explicitly constructing the full resolution histogram. As described above, the full-resolution histogram is generally created one photon at a time. Mechanisms described herein can be used to generate a compressed histogram in an online fashion where each photon (and its timing information) is observed once, without explicitly storing the timing information past a next photon detection (e.g., any stored timing information may be replaced when a next photon is detected). This is challenging because compression schemes often require having access to the entire data set to be compressed before performing compression.

In some embodiments, mechanisms described herein can use a class of linear compression techniques which can be expressed as a simple matrix operator. Specifically, the compressed representation can be expressed as the product of a K×N coding matrix, C, and the N×1 histogram $\Phi$. The effectiveness of a coding matrix can be measured by the compression ratio (N/K) that is achieved, while preserving down-stream task (e.g., depth estimation) performance.

Additionally, the entire full-resolution histogram can be written as the sum of several one-hot encoding vectors, each vector representing one timestamp. Formalizing this representation, $t_j(t_{j,i})_{i=0}^{N-1}$ can represent be the one-hot encoding vector of the $j^{th}$ photon timestamp ($T_j$) detected, where all elements are 0 except for $t_{j,i}=1$, in which $$l = \left\lfloor \frac{T_j \bmod \tau}{\Delta} \right\rfloor.$$

As shown in FIG. 5A, the measured histogram, $\Phi$, can be represented as:

$$\Phi_i = \Sigma_{j=0}^{M-1} t_{j,i} \qquad (3)$$

where M is the total number of detected photons.

Given these observations, an online histogram compression algorithm can be designed by multiplying the coding matrix with the one-hot encoding timestamp vector:

$$B_k = \Sigma_{i=0}^{N-1} C_{k,i} \hat{\Phi} = \Sigma_{i=0}^{N-1} \Sigma_{j=0}^{M-1} C_{k,i} t_{j,i} \qquad (4)$$

where B is the compressive single-photon histogram (C-SPH), whose elements are coded projections of $\Phi$. As described above in connection with FIGS. 4A and 4B, a C-SPH can be implemented using K accumulators, which are updated as each photon arrives. Note that the timing information does not need to be stored explicitly, nor does the full-resolution histogram need to be created. For example, the only data generated and stored for more than a single photon detection, and output by the compressive SPAD sensor can be the C-SPH B.

Figures 6A, 6B:
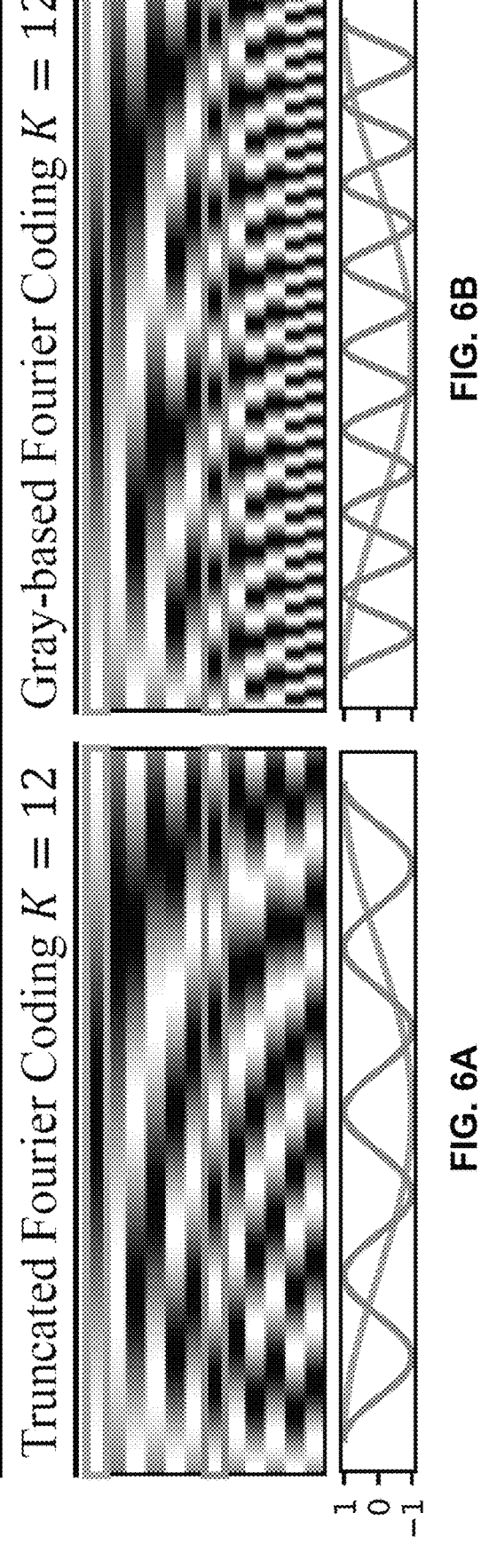
FIG. 6A shows an example of a truncated Fourier coding matrix with twelve rows.
FIG. 6B shows an example of a Gray-based Fourier coding matrix with twelve rows.

FIG. 6A shows an example of a truncated Fourier coding matrix with twelve rows, and FIG. 6B shows an example of a Gray-based Fourier coding matrix with twelve rows.

The odd and even rows of the truncated Fourier matrix of FIG. 6A can be given by $$\cos\left(\frac{2\pi fi}{N}\right) \text{ and } \sin\left(\frac{2\pi fi}{N}\right),$$

respectively, where $f = \lceil 0.5k \rceil$, $1 \leq k \leq K$, and i is the column. The odd and even rows of the Gray-based Fourier matrix of FIG. 6B can be given by $$\cos\left(\frac{2\pi 2^{f-1}i}{N}\right) \text{ and } \sin\left(\frac{2\pi 2^{f-1}i}{N}\right),$$

respectively, and for $k > 2\log_2(N)$ the rows can be generated using codes from the Truncated Fourier matrix that have not yet been used. As shown in FIGS. 6A and 6B, values in the coding matrix can include non-binary values. For example, the values in the coding matrices of FIGS. 6A and 6B have a value in a range of $[-1, 1]$. However, coding matrices that include only binary values can also be implemented (e.g., the Gray coding matrix shown in FIG. 5C, the coarse histogramming matrix shown in FIG. 5B). In some embodiments, binary values can be $-1$ and 1, rather than 0 and 1. For example, in FIG. 5C, the values are $-1$ or 1, rather than 0 and 1, as in the coarse histogramming matrix of FIG. 5B. In some embodiments, using values in a range of $-1$ to 1 (e.g., including $-1$ and 1) and a mean of rows of the coding matrix as 0 can cause photon detections due to ambient light to cancel each other out (e.g., at least to an extent). For example, this can facilitate using fewer bits to track values in the compressive histogram, as photons due to ambient light can cancel by causing values to revert toward the mean of zero.

In theory, C can be chosen to be any set of K linear projections. In practice, however, certain properties that C should have to achieve high compression rates while preserving 3D imaging performance can be identified.

The $i^{th}$ column of C can be interpreted as a code word of length K that represents the $i^{th}$ time bin of a full-resolution histogram. This code word vector can be viewed as a point in a K-dimensional space. Moreover, consider a curve that is traced by the N points (columns of C), denoted as the coding curve $\mathcal{C}$. This coding curve concept can be used to define desirable properties of C. A "good" compressive single-photon 3D imaging coding matrix can be expected to have most or all of the following properties: uniqueness property, robustness property, indirect reflections property, and band-limit property.

Uniqueness Property: Each point in $\mathcal{C}$ is unique. That is, $\mathcal{C}$ should be non self-intersecting. This guarantees that two different bins are not represented by the same code word.

Robustness Property: $\mathcal{C}$ should be locality preserving. Meaning that if a small perturbation is added to a point on the curve, it should map to neighboring points along the curve, which correspond to code words associated with similar time bins.

Indirect Reflections Property: The coding functions (rows of C) encode information of the photon flux waveform in a similar way as correlation functions do in correlation-based time-of-flight (C-ToF) imaging. In the presence of diffuse indirect light reflections, the direct-only model from EQ. (1) becomes invalid. Diffuse indirect reflections arise when imaging concave geometries or in the presence of volumetric scattering, and is particularly problematic in flash illumination systems. Diffuse indirect reflections appear in $\Phi(t)$ as smooth band-limited signals. Therefore, the direct-only model represented by EQ. (1) can be expected to still apply for coding functions with frequencies above a scene dependent threshold.

Figure 7:
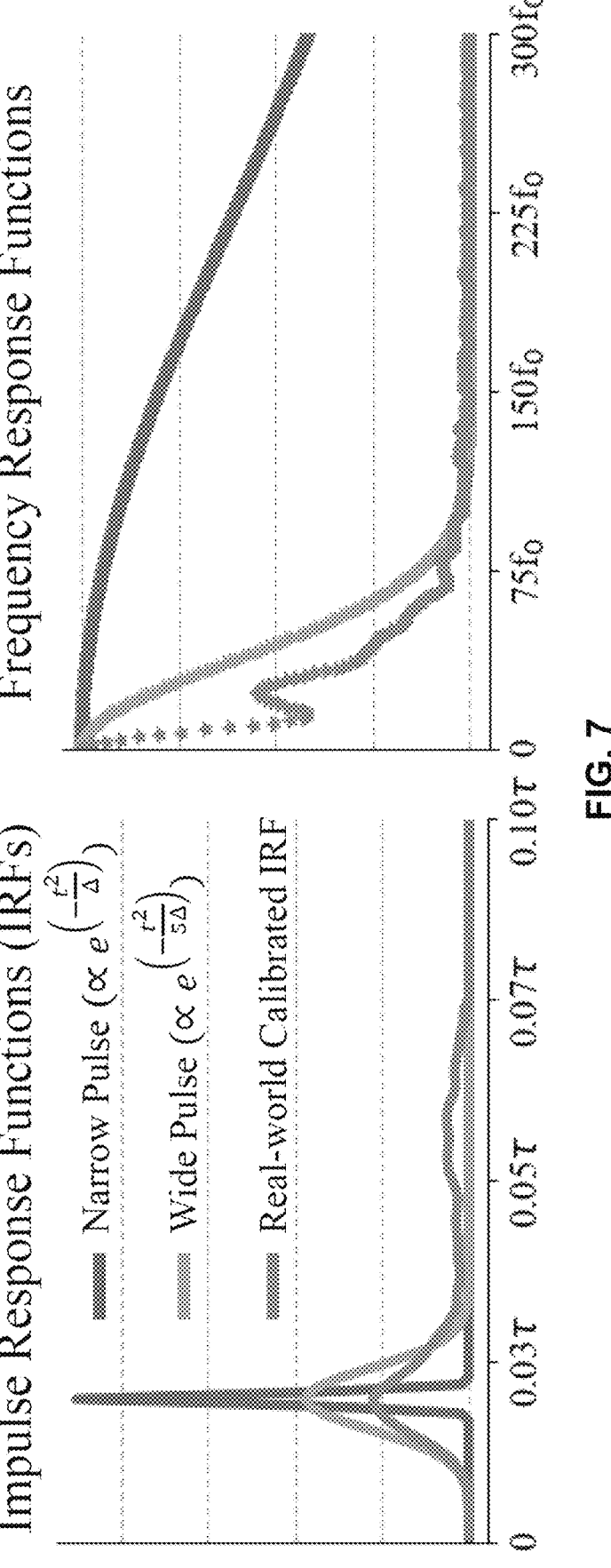
FIG. 7 shows an example of various system impulse response functions, and corresponding frequency response functions.

FIG. 7 shows an example of various system impulse response functions, and corresponding frequency response functions.

System Impulse Response Functions (IRF) (h(t)). Gaussian pulses can be used as approximations used the system IRF because the single-photon 3D cameras use pulsed illumination signals. Although this approximation may be valid for some systems, the experimental system used for the results described below in connection with FIG. 11 exhibited an IRF with a long-tail (as shown with the green line n FIG. 7). Analyzing the frequency domain representation of the IRF can be a useful step when designing a coding matrix of a compressive single-photon 3D camera.

Band-limit Property: The coding functions should not all be high-frequency functions when the goal is to encode a photon flux waveform with a smooth system IRF (h(t)). This is because if a given coding function is composed of frequencies that are above the bandwidth of h(t), then the expected encoded value will be 0 (e.g., as described further in Appendix A, which is hereby incorporated by reference herein in its entirety). The orange and green lines of FIG. 7 show examples of smooth IRFs. This means that, although high frequencies can mitigate indirect reflections, very high frequency codes may not be useful if they are outside of h(t) bandwidth.

The following C-SPH coding matrices are described herein, and were analyzed and evaluated:

1. Coarse Histogram: C is a downsampling matrix, where each row is a rectangular window with length N/K (e.g., as shown in FIG. 5B). This matrix does not fulfill the uniqueness property described above because each window maps multiple bins to the same code word vector. This type of C-SPH is equivalent to previously described coarse in-pixel histograms (e.g., as described in Rocca et al., "A 128×128 spad motion-triggered time-of-flight image sensor with in-pixel histogram and column-parallel vision processor," *IEEE Journal of Solid-State Circuits*, 55(7):1762-1775, (2020)).

2. Truncated Fourier: C is made up of the first K rows of the discrete Fourier transform matrix, skipping the zeroth harmonic. This matrix fulfills the uniqueness property, and at higher K it may contain high frequency codes that can mitigate indirect reflections.

3. Continuous Gray: Also known as Hamiltonian codes, the Cont. Gray coding curve is a Hamiltonian cycle on a K-dimensional hypercube, which is provably locality preserving (robustness property). The rows of C are generated by constructing K-bit Gray code, where each Gray code will have length $2^K$, and linearly interpolating them to have length N. For a histogram of length $N=2^K$ this coding matrix becomes fully binary. FIG. 5C shows a cont. Gray coding matrix with K=8.

4. Gray-based Fourier: For Nhistogram bins, Gray coding is only valid for $K \leq \log_2(N)$ because the higher-order coding functions start aliasing. However, in lower SNR scenarios it is sometimes desired to increase K to preserve depth precision. To this end, a coding scheme is described herein that combines properties of Gray and Fourier coding. For the first $k \leq \log_2(N)$ rows, Fourier components are sampled using the frequency doubling pattern observed in the Gray coding matrix in FIG. 5C. For the remainder $2 \log_2(N) < k < K$ codes, revert back to a Trunc. Fourier sampling using the remaining frequencies.

Additional coding schemes are described in Appendix A, which has been incorporated herein by reference. These additional coding schemes include Fourier-based Gray Coding, Hadamard, and short-time Fourier.

A C-SPH can achieve isometric compression when its performance is within a specified margin of the uncompressed full-resolution histogram (FRH). For example, this can be represented as:

$$\text{Isometric Compression}(\varepsilon) = \varepsilon_{diff} \leq \varepsilon \tag{5}$$

where $\varepsilon_{diff} = \varepsilon_{FRH} - \varepsilon_{CSPH}$, $\varepsilon_{FRH}$ and $\varepsilon_{CSPH}$ are the performance metrics for a C-SPH and a FRH, and E is the desired performance difference margin.

To quantify 3D imaging performance, the relative mean depth errors (MDE) can be calculated over the depth range through Monte Carlo simulations using the direct-only model represented in EQ. (1) (see Appendix A, which has been incorporated by reference herein, for additional description of quantification of 3D imaging performance). Consequently, to identify isometric compression the difference can be taken between the relative MDE of a full-resolution histogram (FRH) ($\varepsilon_{FRH}$) and the C-SPH ($\varepsilon_{CSPH}$) and the difference can be classified into different margins. For context, in a 3D imaging scenario with a 10 meter (m) depth range, a relative MDE difference of $\varepsilon_{diff}=0.1\%$ corresponds to the C-SPHs MDEs being within 1 centimeter (cm) of the FRH MDEs.

To decode depths from a C-SPH, the zero-mean normalized cross-correlation (ZNCC) can be calculated between $\hat{B}$ and C:

$$t_z \propto \underset{i}{\arg\max} \frac{C_{:,i}^h - \text{mean}(C_{:,i}^h)}{\left\| C_{:,i}^h - \text{mean}(C_{:,i}^h) \right\|} \frac{\hat{B} - \text{mean}(\hat{B})}{\left\| \hat{B} - \text{mean}(\hat{B}) \right\|} \tag{6}$$

where $C_{:,i}^h$ is the $i^{th}$ column of $C^h$, and $C^h$ is the coding matrix, C, with each row convolved with the system IRF h. To compute depths for FRHs a matched filtering was used, which is similar to applying EQ. 6 when C is an N×N identity matrix. Additional description of the ZNCC depth decoding algorithm is described in Appendix A, which has been incorporated herein by reference.

Figure 8:
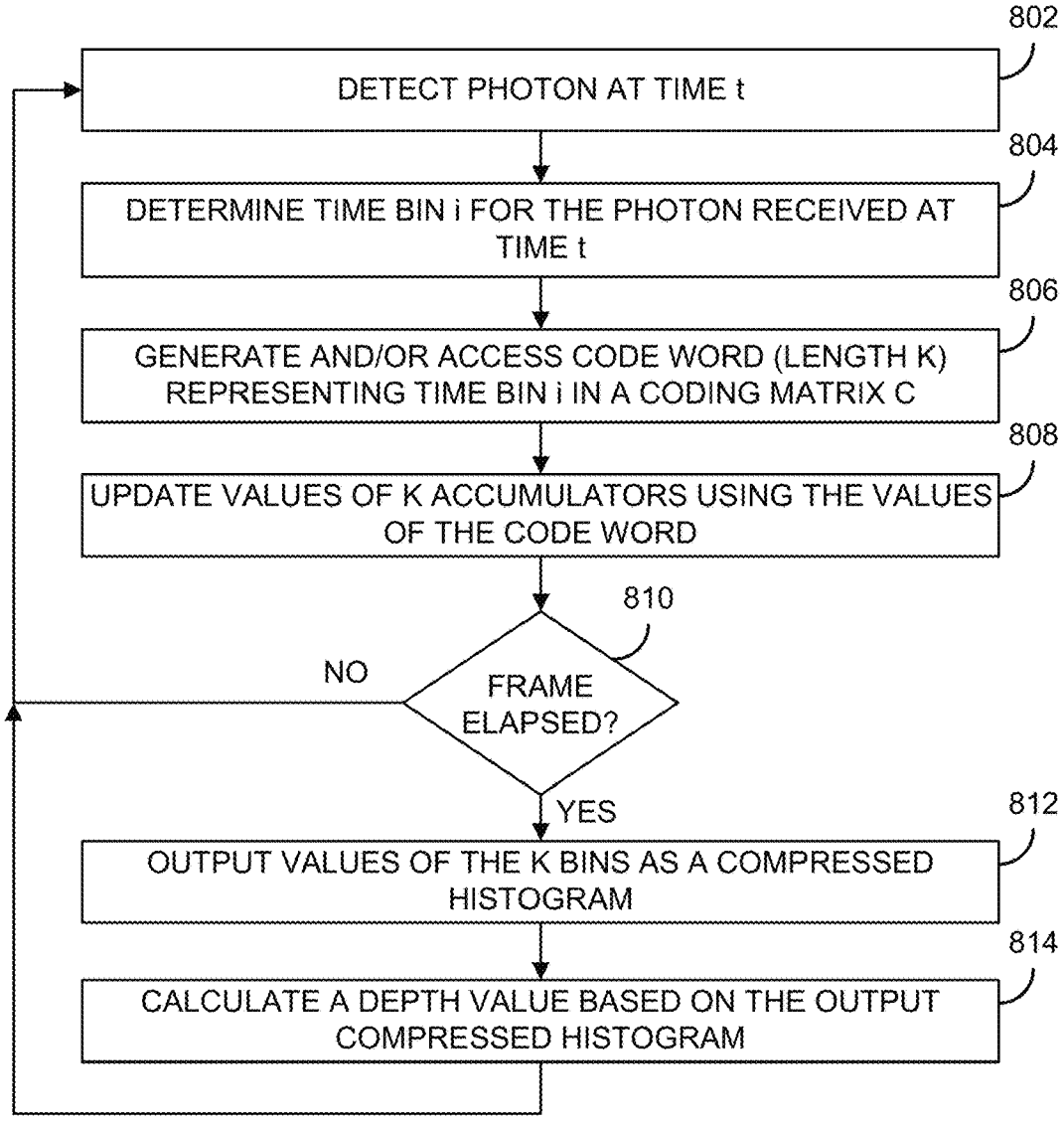
FIG. 8 shows an example of a process for improving the efficiency of calculating depth in a single photon depth imaging system in accordance with some embodiments of the disclosed subject matter.

FIG. 8 shows an example 800 of a process for improving the efficiency of calculating depth in a single photon depth imaging system in accordance with some embodiments of the disclosed subject matter. At 802, process 800 can detect an arrival of photon at a single-photon detector at time t using any suitable technique or combination of techniques. For example, process 800 can detect the arrival of a photon based on activation of a SPAD, which can cause a time stamp (e.g., by a time-to-digital converter) corresponding to the time t at which the photon was detected.

At 804, process 800 can determine a time bin i of a histogram (e.g., a full-resolution histogram) for the photon detected at time t using any suitable technique or combination of techniques. For example, process 800 can determine a difference between a time when a light source emitted a pulse, and time t when the photon was detected, and can determine which bin of the histogram corresponds to the time difference.

At 806, process 800 can generate and/or access a code word (e.g., of length K) that represents time bin t in a coding matrix C that is used to generate a compressive histogram. In some embodiments, process 800 can use any suitable technique or combination of techniques to generate and/or access the code word.

For example, process 800 can generate and/or access the code word from memory associated with bin i. In such an example, memory can be configured to store a code word for each column of the coding matrix C at an address associated with a corresponding bin. Process 800 can access the code word using the bin i to determine an address from which to retrieve the code word.

As another example, process 800 can generate a one-hot encoded vector with a value of 1 at an element corresponding to time bin i, and 0s at the other elements. In such an example, process 800 can multiply the one-hot encoded vector and the coding matrix C to generate the code word corresponding to code bin i.

As yet another example, a coding matrix (e.g., a binary Gray coding matrix) can be implemented using Boolean logic (e.g., via logic gates implemented in hardware and/or software). In such an example, a row of a binary coding matrix (e.g., a binary Gray coding matrix), can be implemented using boolean logic. Considering a first row of a binary Gray coding matrix, Boolean logic can be implemented that is configured to output −1 if time bin $$i < \frac{N}{2},$$

and to output 1 otherwise.

As still another example, a code word can be generated using an analytical expression. In a more particular example, a code word for a coding matrix that implements a Gray-based Fourier code can be generated using analytical expressions $$\cos\left(\frac{2\pi 2^{f-1} i}{N}\right)$$

for odd rows and $$\sin\left(\frac{2\pi 2^{f-1} i}{N}\right)$$

for even rows, for the first $2 \log_2(N)$ rows (e.g., for $1 \leq k \leq 2 \log_2(N)$), and using analytical expressions $$\cos\left(\frac{2\pi f i}{N}\right)$$

(for odd rows) and $$\sin\left(\frac{2\pi f i}{N}\right)$$

19

20

(for even rows) for the remaining rows (e.g., for 2 $\log_2(N)$ $\leq k \leq K$), the where N is the maximum number of time bins, $f = \lceil 0.5k \rceil$, and t is the time bin/column corresponding to the received photon.

At 808, process 800 can update the values of K accumulators used to store the values of the compressive histogram being constructed for the single-photon detector that was used to detect the photon at 802. For example, each value in the code word can be added to a corresponding accumulator of the K accumulators. As described above, in some embodiments, accumulator updates can be performed using various techniques, and the techniques used can depend on the implementation of the coding matrix (e.g., using integers, fixed-point numbers, floating point numbers, etc.).

At 810, process 800 can determine whether a frame has elapsed (e.g., whether a time period corresponding to a single depth measurement has elapsed). For example, after a time associated with a frame (e.g., 33 milliseconds at 30 fps, 10 milliseconds at 100 fps) has elapsed from a previous readout (e.g., based on a reset signal), process 800 can determine that a frame has elapsed.

If process 800 determines that a frame has not elapsed ("NO" at 810), process 800 can return to 802 and can detect a next photon. Note that a photon may not be detected for each light source emission, and process 800 can move from 802 to 810 without a photon detection if a detection period τ has elapsed without a photon detection.

Otherwise, if process 800 determines that a frame has elapsed ("YES" at 810), process 800 can move to 812. At 812, process 800 can output values from the accumulators corresponding to the K bins of the compressive histogram. For example, after a frame has elapsed, process 800 can output the values of the K bins to processor 408.

At 814, process 800 can calculate a depth value (which may be an estimate of the depth at a scene point from which the photons detected at 802 were received) based on the values of the K bins of the compressed histogram, and the coding matrix that was used to generate the compressed histogram. For example, process 800 can use EQ. (6) to calculate a depth value.

In some embodiments, process 800 can be repeated for each frame and/or for each photon detector (e.g., each SPAD) of the image sensor.

Figure 11:
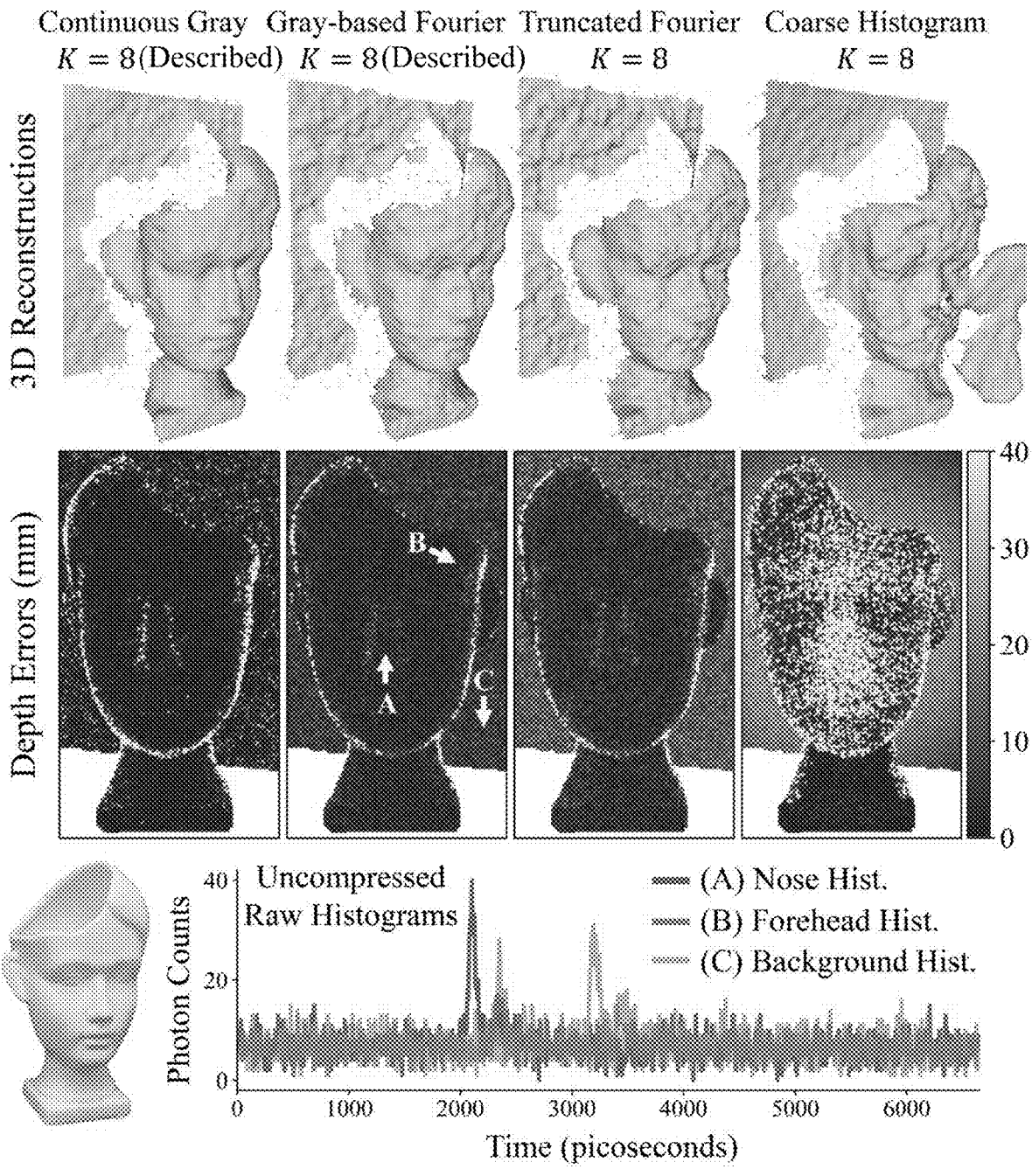
FIG. 11 shows an example of depth estimates and depth errors generated using various histogram compression techniques.

In some embodiments, depth value generated using process 800 can be used to generate a depth image (e.g., such as depth images shown in FIG. 3A, FIG. 11, and FIG. 12).

Figure 9A:
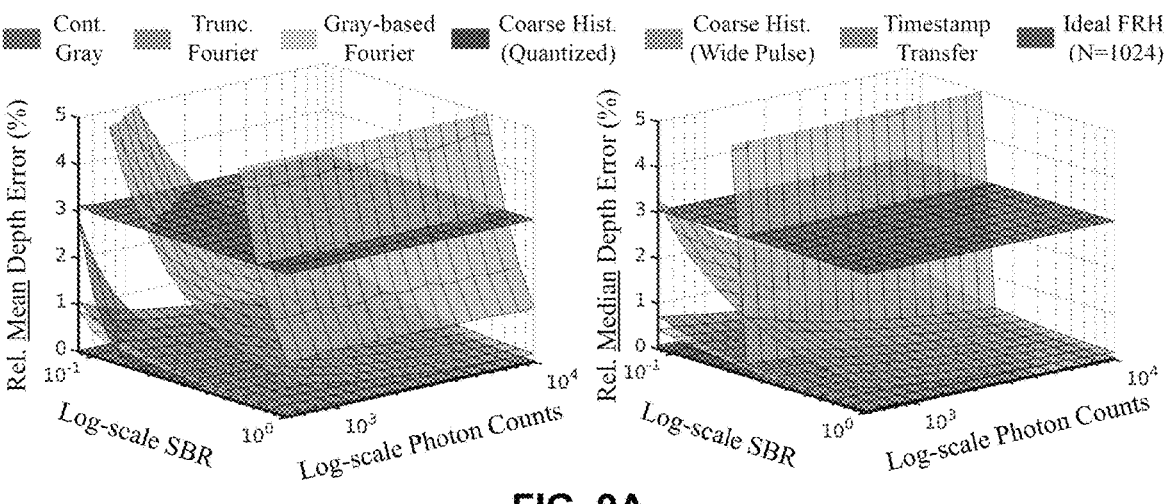
FIG. 9A shows an example of the relative mean and median depth errors computed over the full depth for various techniques for estimating depth in a single photon depth imaging system.
Figure 9B:
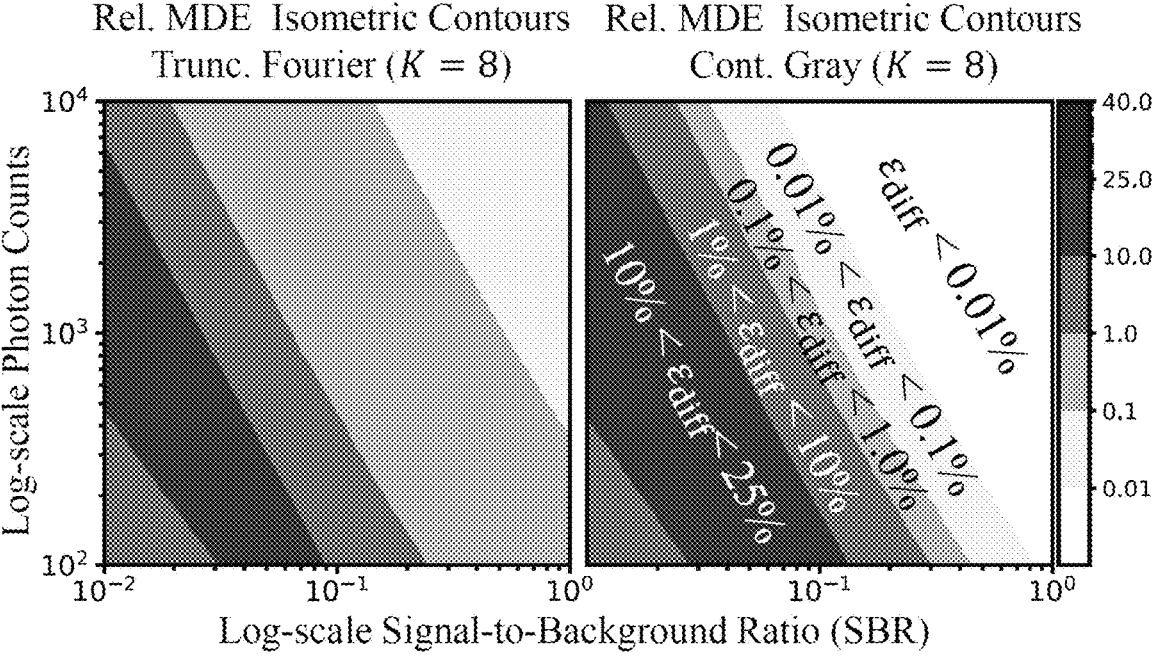
FIG. 9B shows isometric contours generated by the relative mean depth error difference between a truncated Fourier coding matrix and a full-resolution histogram and between a continuous Gray coding matrix and the full-resolution histogram.

FIG. 9A shows an example of the relative mean and median depth errors computed over the full depth for various techniques for estimating depth in a single photon depth imaging system, and FIG. 9B shows isometric contours generated by the relative mean depth error difference between a truncated Fourier coding matrix and a full-resolution histogram and between a continuous Gray coding matrix and the full-resolution histogram.

In FIG. 9A, an isometric compression analysis at 128X compression is shown. the relative mean and median depth errors are computed over the full depth for various techniques, including generating compressive histograms (using a continuous Gray coding matrix, using a truncated Fourier coding matrix, using a Gray-based Fourier coding matrix, using a quantized coarse histogram coding matrix, using a coarse histogram coding matrix with a wide pulse shape), explicitly transferring a limited number (e.g., at most K) time stamps (labeled timestamp transfer), and using an idealized full-resolution histogram. At these high compression levels where the C-SPH methods only use K=8 codes, only the Gray-based and Fourier-based C-SPH achieve low errors at a wide range of signal-to-background ratio (SBR) and photon count levels. If the mean and median error significantly differ for a given technique at a fixed SBR and photon count, it can indicate that the variance of the errors is large (e.g., Gray coding and Timestamp transfers). In FIG. 9B, isometric contours generated by the relative MDE difference of Trunc. Fourier and Gray coding are shown with a FRH (point-wise difference of surface plots in FIG. 9A). At SBR≥0.1 and photon counts ≥1000 these C-SPHs depth errors are consistently within 1% of the FRH. However, at SBR≤0.05 and photon counts ≥1000 their performance significantly degrades relative to that of the ideal FRH. Finally, at low SBR and photon-starved settings (bottom m left), the relative performance difference decreases again because FRH also starts performing poorly.

A high-performance single-photon 3D imaging system will match the laser pulse width with the SPAD sensor time resolution ($\Delta$). In connection with FIGS. 9A and 9B, isometric compression is analyzed at a wide range of signal-to-background ratio (SBR) and photon count levels $$(SBR = \frac{\Sigma_{i=0}^{N} \Phi_i^{sig}}{N \Delta \Phi^{bkg}}, \text{ Photon Counts} = \sum_{i=0}^{N} \Phi_i),$$

for the case of a FRH with N=1024 bins that records a Gaussian pulse of width $\Delta$ (i.e., $h(t) \propto \exp^{-(t)^2/\Delta}$, see blue line in FIG. 7). In addition to the C-SPH coding schemes described above in connection with FIGS. 6 and 7, the following two baselines were also evaluated:

Coarse Hist. (Wide Pulse): A coarse histogram C paired with a wide Gaussian pulse width that matches the window length, which enables sub-bin precision.

Truncated Timestamps: A FRH constructed with at most K timestamps, even if the number of detected photons is >K. Although, not a C-SPH, this is an important baseline corresponding to the simplest SPAD pixel that transfers the same amount of data as a size KC-SPH.

FIG. 9A shows the relative mean and median depth errors for different coding matrices with K=8, resulting in a compression ratio of 128×. The ideal FRH obtains near 0 error in the visualized SBR and photon count levels. In this extreme compression regime, Gray coding is the only C-SPH that achieves an isometric compression where, $\varepsilon_{diff} \leq 0.01\%$, at various SBR and photon count levels, essentially matching FRH performance (see, e.g., FIG. 9B). The difference in the mean and median error trends indicates that at low SBR and low photon counts, Gray coding produces either high or near zero errors. On the other hand, the error magnitudes of Trunc. Fourier coding are similar across SBR and photon count levels. Unfortunately, even at high SBR levels, Trunc. Fourier still does not each isometric compression with $\varepsilon_{diff} \leq 0.01\%$. Gray-based Fourier coding consistently outperforms Trunc. Fourier, and is more robust to outliers than Gray coding at low SBR. As expected, the coarse histogramming techniques are either quantization-limited due to low time resolution or noise-limited when using a wide pulse. Finally, only transferring 8 timestamps, although practical, leads to poor performance at low SBR and leads to many outliers at high SBR.

Figure 10:
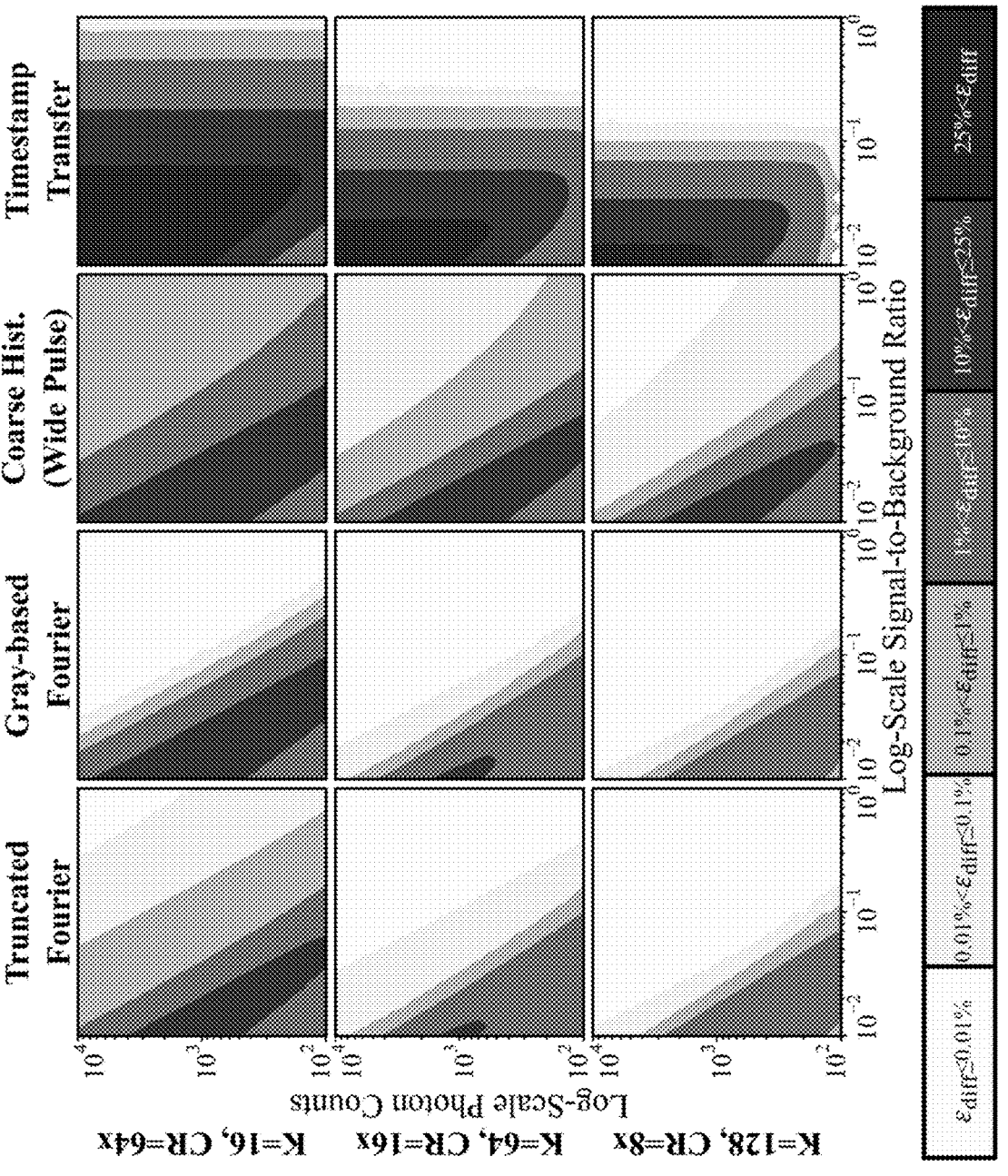
FIG. 10 shows examples of isometric contours generated by the relative mean depth error of various techniques at different compression ratios.

FIG. 10 shows examples of isometric contours generated by the relative mean depth error of various techniques at different compression ratios. As shown in FIG. 10, as K increases the isometric compression regions with $\varepsilon_{diff} \leq 0.01\%$ increase for all techniques. For SBR and photon count levels greater than ~0.1 and ~1000, respectively, Gray-based Fourier coding with K≥16 performs as well as a FRH with N=1024. Truncated Fourier Coding, on the other hand, requires higher K to reach a $\varepsilon_{diff} \leq 0.01\%$ at those SBR and photon count levels. Overall, carefully designed coding matrices such as Fourier and Gray-based, consistently outperform standard approaches (e.g., coarse histograms and timestamp transfer).

FIG. 10 illustrates how the isometric compression contours change as K increases for the different coding schemes. As K increases and compression decreases, the performance of all techniques improves and approaches FRH performance, in particular for carefully designed C-SPH coding schemes like Gray-based and Trunc. Fourier. Note that this increase in performance is associated with an increase in data rate, as well, resulting in a tradeoff between performance and efficiency (e.g., potentially limiting the frame rate that can be achieved with a particular scheme).

At K≤64 the benefits of Gray-based Fourier coding are more evident as the isometric contours where its performance matches FRH cover the biggest range of SBR and photon count levels (i.e., $\varepsilon_{diff} \leq 0.011\%$). As K continues to increase, the Gray-based Fourier coding matrix becomes more similar to Trunc. Fourier coding, hence, their performance becomes similar, as observed in their K=128 isometric contours. Overall, Gray-based and Fourier-based C-SPH coding, consistently outperform current photon timestamp storage and transfer approaches (coarse histograms and direct transfer of timestamps). Interestingly, transferring only K timestamps significantly outperforms a coarse histogram at many combinations of SBR and photon counts.

C-SPH was also evaluated for a Gaussian pulse of width Δ. As the pulse width increases, the effective time resolution of the system decreases, impacting the performance of the FRH baseline, and consequently making the isometric compression regions with low relative differences larger at lower K. Moreover, shown in FIG. 7, slightly widening the pulse decreases the frequency content of the signal significantly, making compressive coding strategies even more efficient because such strategies only need to sample the non-zero frequencies. Results and analysis related to using wider pulses are described in Appendix A, which has been incorporated herein by reference.

FIG. 11 shows an example of depth estimates and depth errors generated using various histogram compression techniques. In particular, depth estimates and errors are presented for scan-based compressive single-photon 3D imaging. The depth and depth error images for different C-SPH with K=8 codes are shown, with mean and median absolute errors (in millimeters (mm)) achieved by each technique presented from left to right are: [9, 6], [23, 13], [6, 4], [7, 1], respectively.

Figure 12A:
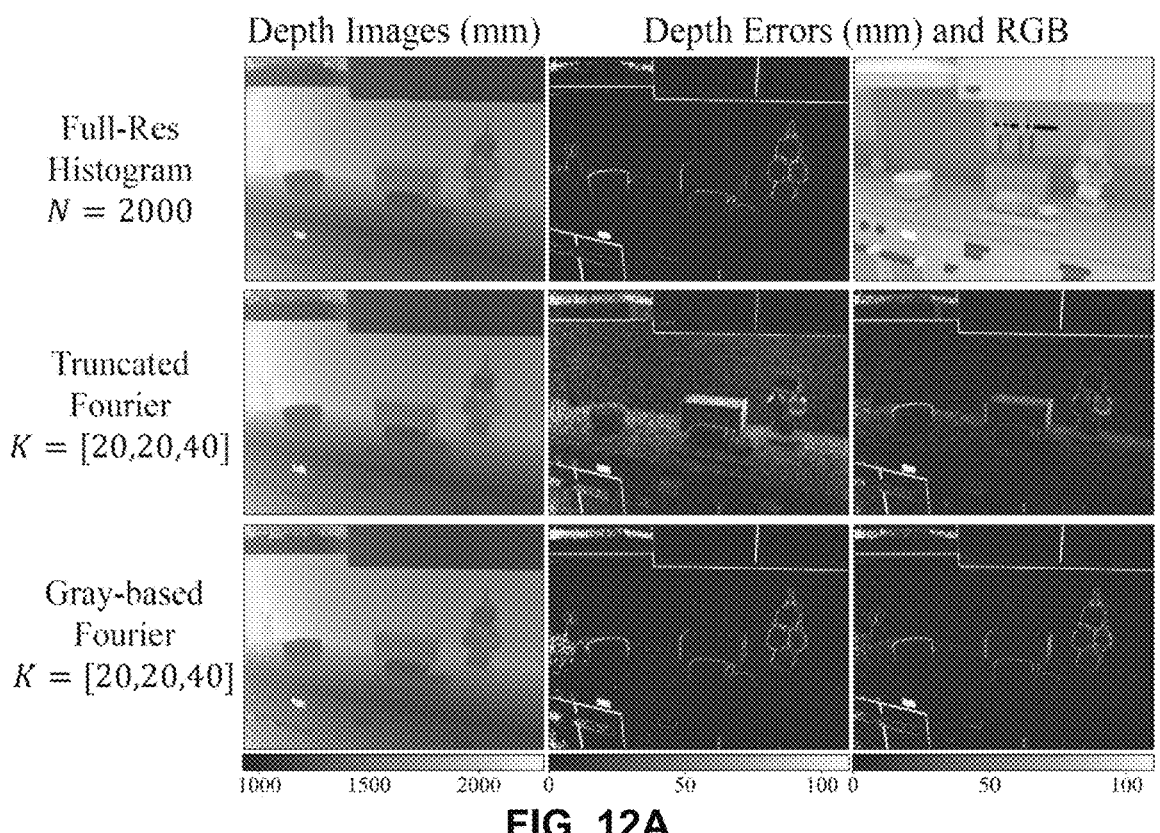
FIG. 12A shows an example of depth images of a simulated scene of a kitchen and depth errors generated using a truncated Fourier coding matrix and a Gray-based Fourier coding matrix.
Figure 12B:
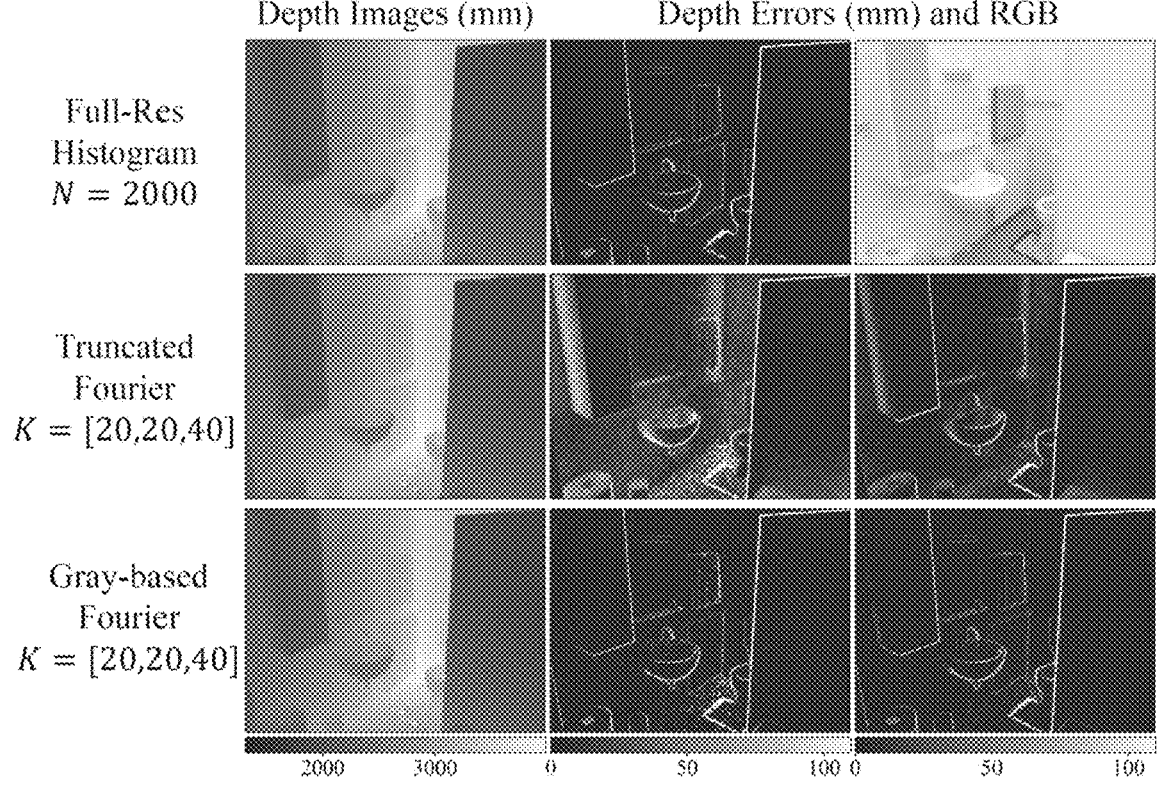
FIG. 12B shows an example of depth images of a simulated scene of a bathroom and depth errors generated using a truncated Fourier coding matrix and a Gray-based Fourier coding matrix.

The results shown in FIGS. 11, 12A, and 12B are based on an analysis of C-SPH coding approaches on data from a real-world scanning-based system, and also from a flash-illuminated single-photon 3D imaging simulation that uses physically accurate histogram images rendered with MitsubaToF, respectively.

To evaluate the effectiveness of C-SPHs on real SPAD timestamp data, data acquired with a scanning-based system (described in Gupta et al., "Asynchronous single-photon 3D imaging," in "Proceedings of the IEEE International Conference on Computer Vision," pages 7909-7918 (2019)) were downloaded and pre-processed. The preprocessed per-pixel full-res histograms have Δ=8 picoseconds (ps) and N=832 bins. FIG. 11 shows a few example raw histograms. For depth estimation the center pixel histogram was extracted, denoised, and used as the system IRF (the green line in FIG. 7). Ground truth depths were obtained from the FRH with light Gaussian denoising applied to it (σ=0.75), and the pixels were masked where even FRH had too low of an SBR to estimate reliable depths (e.g., shown as regions in FIG. 11 images). FIG. 11 shows the recovered depth images using different C-SPH of length K=8, providing a compression ratio of 104×. Similar to the analysis described above in connection with FIGS. 9A and 9B, the Gray-based coding was able to essentially achieve 0 errors for pixels with sufficient signal, while sometimes making large errors (outliers). Trunc. Fourier and Gray-based Fourier, on the other hand, were robust to outliers, but made a lot of small and medium sized errors. Moreover, the background wall histograms exhibited a longer tail than the foreground face histograms, likely due to indirect inter-reflections. These indirect reflections cause systematic errors in Trunc. Fourier, while Gray-based Fourier and Gray coding are more robust to these errors since their matrices have coding function with higher frequencies. This matches the intuition provided by the indirect reflection property described above in connection with FIG. 6. Finally, due to the long tail of the system IRF, a coarse histogram with only K=8 can achieve sub-bin precision using ZNCC decoding. Nonetheless, its performance is significantly worse than the other C-SPH methods. Appendix A, which has been incorporated herein by reference, includes additional results at different K and also results generated using a different scan.

FIG. 12A shows an example of depth images of a simulated scene of a kitchen and depth errors generated using a truncated Fourier coding matrix and a Gray-based Fourier coding matrix, and FIG. 12B shows an example of depth images of a simulated scene of a bathroom and depth errors generated using a truncated Fourier coding matrix and a Gray-based Fourier coding matrix. In particular, depth estimates and errors are presented for flash illumination compressive single-photon 3D imaging. Depth images and depth errors are shown for C-SPH techniques applied to histograms of illuminated scenes. The kitchen and bathroom scenes were simulated with a mean photon count and mean SBR of (1000, 0.25) and (1000, 0.5), respectively. The top row for FIGS. 12A and 12B has the recovered depths and depth errors of an FRH with 2000 bins, and the RGB image of the scene. The second and third rows have the C-SPH depths (for K=20), and the depth errors for K=20 (middle column) and K=40 (right column). The mean and median absolute errors (in mm) for the kitchen scene were: FRH-2000: (14, 3), Trunc. Fourier-20: (26, 10), Gray Fourier-20: (22, 3), Trunc. Fourier-40: (16, 4), Gray Fourier-40: (14, 3). Similarly, for the bathroom scene: FRH-2000: (10, 3), Trunc. Fourier-20: (24, 11), Gray Fourier-20: (12, 3), Trunc. Fourier-40: (14, 4), Gray Fourier-40: (11, 3).

SPAD arrays can be used in flash illumination systems to achieve a fully solid-state single-photon LiDAR. To evaluate C-SPHs in a flash illumination system, physically accurate histogram images rendered with MitsubaToF were used with Δ=50 ps and N=2000. The Mitsuba scenes were obtained from Gutierrez-Barragan et al., "itof2dtof: A robust and flexible representation for data-driven time-of-flight imaging," arXiv preprint arXiv:2103.07087 (2021). The ground truth histogram image does not contain any background photons, so its corresponding RGB image was used as an approximation of the per-pixel background photons. To simulate the FRHs the mean photon count and mean SBR levels for the scene were set, and were used to scale the histogram image and the background image (using the R channel of RGB).

FIGS. 12A and 12B show the resulting depth images and depth errors for two different scenes. In addition to the edges where true depth is ambiguous, both scenes have regions with very low SBR where even the FRH has some depth errors (e.g., stove in kitchen, and the mat in bathroom). Due to indirect reflections, Truncated Fourier makes significant systematic errors even when using K=40 codes. On the other hand, Gray based Fourier recovers highly accurate depths like an FRH, while using 50-100× less data.

In general, SPAD-based 3D cameras with high spatio-temporal resolution can produce unmanageable data rates. In some embodiments, mechanisms described herein can be used to generate a compressive representation (C-SPH) of the high resolution timing histogram, from which depths can be computed, which can reduce data bandwidth require-ments of SPAD-based 3D cameras without significantly impacting accuracy. The C-SPH is built in an online manner by effectively multiplying each photon timestamp with a coding matrix and aggregating them onto compressive bins. By designing the coding matrix appropriately, a C-SPH can match the depth precision of a full-resolution histogram in a wide range of scenarios, while outputting significantly less data per-pixel.

C-SPHs are designed to reduce the per-pixel output data rate, which requires in-pixel implementation. Recent advances in 3D-stacking CMOS technology can be lever-aged to implement SPAD pixel architectures that utilize different C-SPHs. Coarse histograms implemented using such 3D-stacking technology have been implemented. The in-pixel C-SPH implementation may impose interesting practical constraints on the structure of the coding matrix. For example, the pixel architecture for a binary C (e.g., coarse histograms or Gray coding with $K=\log_2(N)$) may be simpler than for a C with continuous values.

When less than 20 photons are recorded, timestamp transfer can outperform a C-SPH at SBR>1. At lower SBR levels all techniques begin to fail and perform comparably. Ultimately, low SBR and photon-starved scenarios require denoising to recover reliable depths. Denoising a C-SPH instead of the full 3D histogram image may provide com-putational benefits.

Efficient Depth Estimation: The ZNCC depth estimation technique described above in connection with EQ. (6) allows comparing different coding matrices under a single framework. One limitation of the ZNCC implementation described herein is its linear computational and memory complexity. Given that ZNCC is a template matching algo-rithm, efficient coarse-to-fine implementations may be pos-sible. Alternatively, algorithms tailored for a particular C may provide further computational benefits. For instance, Fourier coding has different analytical, optimization-based, and data-driven depth decoding algorithms.

In some embodiments, any suitable computer readable media can be used for storing instructions for performing the functions and/or processes described herein. For example, in some embodiments, computer readable media can be tran-sitory or non-transitory. For example, non-transitory com-puter readable media can include media such as magnetic media (such as hard disks, floppy disks, etc.), optical media (such as compact discs, digital video discs, Blu-ray discs, etc.), semiconductor media (such as RAM, Flash memory, electrically programmable read only memory (EPROM), electrically erasable programmable read only memory (EE-PROM), etc.), any suitable media that is not fleeting or devoid of any semblance of permanence during transmis-sion, and/or any suitable tangible media. As another example, transitory computer readable media can include signals on networks, in wires, conductors, optical fibers, circuits, or any suitable media that is fleeting and devoid of any semblance of permanence during transmission, and/or any suitable intangible media.

It should be noted that, as used herein, the term mecha-nism can encompass hardware, software, firmware, or any suitable combination thereof.

It should be understood that the above described steps of the process of FIG. 6 can be executed or performed in any order or sequence not limited to the order and sequence shown and described in the figures. Also, some of the above steps of the processes of FIG. 6 can be executed or per-formed substantially simultaneously where appropriate or in parallel to reduce latency and processing times.

Although the invention has been described and illustrated in the foregoing illustrative embodiments, it is understood that the present disclosure has been made only by way of example, and that numerous changes in the details of imple-mentation of the invention can be made without departing from the spirit and scope of the invention, which is limited only by the claims that follow. Features of the disclosed embodiments can be combined and rearranged in various ways.

What is claimed is:

1. A system for determining a depth in a scene, compris-ing:
   a light source;
   a detector configured to detect arrival of individual pho-tons;
   at least one processor that is programmed to:
      (a) detect, based on a signal from the detector, a photon arrival;
      (b) determine a time bin t associated with the photon arrival, wherein the time bin is in a range from 1 to N where N is a total number of time bins;
      (c) update a compressed histogram comprising K stored values representing bins of the compressed histo-gram based on K values in a code word represented by an $i^{th}$ column of a coding matrix C having dimension K×N,
         wherein each column of the coding matrix is differ-ent than each other column of the coding matrix, and each column corresponds to a single time bin i; and
      (d) estimate a depth value based on the K values.

2. The system of claim 1, wherein the detector comprises a single photon avalanche diode (SPAD).

3. The system of claim 1, wherein the coding matrix is a Gray coding matrix.

4. The system of claim 3, wherein the Gray coding matrix is a binary Gray coding matrix.

5. The system of claim 1, wherein the coding matrix is a Gray-based Fourier coding matrix.

6. The system of claim 1, wherein the coding matrix is a Fourier-based Gray coding matrix.

7. The system of claim 1, wherein the at least one processor is further programmed to:
   estimate the depth value using the following:

$$t_z \propto \operatorname*{argmax}_i \frac{C_{:,t}^h - \operatorname{mean}(C_{:,t}^h)}{\left\| C_{:,t}^h - \operatorname{mean}(C_{:,t}^h) \right\|} \cdot \frac{\hat{B} - \operatorname{mean}(\hat{B})}{\left\| \hat{B} - \operatorname{mean}(\hat{B}) \right\|}$$

where $t_z$ is a time-of-flight corresponding to the depth value, $C_{:,i}^h$ is the $i^{th}$ column of $C^h$, and $C^h$ is the coding matrix C with each row convolved with an impulse response function h of the system used to detect the photon at (i), and $\hat{B}$ is the compressed histogram.

8. The system of claim 1, wherein (a) to (c) are performed by circuitry that is implemented on the same chip as the detector.

9. The system of claim 1, the system further comprising an image sensor comprising an array including a plurality of detectors configured to detect arrival of individual photons, including the detector, wherein the at least one processor is further programmed to:

perform (a) to (d) for each of the plurality of detectors.

10. The system of claim 1, the system further comprising an image sensor comprising an array including a first plurality of detectors in a first area and a second plurality of detectors in a second area, each of the first plurality of detectors and the second plurality of detectors configured to detect arrival of individual photons, including the detector, wherein the at least one processor is further programmed to:

perform (a) to (d) for each of the first plurality of detectors; and perform (a) to (d) for each of the second plurality of detectors using a second coding matrix $C_1$ having a number of rows $K_1 > K$.

11. The system of claim 1, wherein the photon arrival is detected during a first frame, and wherein the at least one processor is further programmed to:

repeat (a) to (d) for a second frame using a second coding matrix $C_1$ having a number of rows $K_1 > K$.

12. The system of claim 1, wherein N is at least 1024, and K is no greater than 64.

13. A method for determining a depth in a scene, comprising:

(a) detecting, based on a signal from a detector configured to detect arrival of individual photons, a photon arrival;

(b) determining a time bin t associated with the photon arrival, wherein the time bin is in a range from 1 to N where N is a total number of time bins;

(c) updating a compressed histogram comprising K stored values representing bins of the compressed histogram based on K values in a code word represented by an $i^{th}$ column of a coding matrix C having dimension K×N, wherein each column of the coding matrix is different than each other column of the coding matrix, and each column corresponds to a single time bin i; and (d) estimating a depth value based on the K values.

14. The method of claim 13, wherein the detector comprises a single photon avalanche diode (SPAD).

15. The method of claim 13, wherein the coding matrix is a Gray coding matrix.

16. The method of claim 13, wherein estimating the depth value comprises using the following:

$$t_z \propto \underset{i}{\mathrm{argmax}} \frac{C^h_{:,i} - \mathrm{mean}(C^h_{:,i})}{\left\| C^h_{:,i} - \mathrm{mean}(C^h_{:,i}) \right\|} \frac{\hat{B} - \mathrm{mean}(\hat{B})}{\left\| \hat{B} - \mathrm{mean}(\hat{B}) \right\|}$$

where $t_z$ is a time-of-flight corresponding to the depth value, $C_{:,i}{}^h$ is the $i^{th}$ column of $C^h$, and $C^h$ is the coding matrix C with each row convolved with an impulse response function h of the system used to detect the photon at (i), and $\hat{B}$ is the compressed histogram.

17. The method of claim 13, further comprising performing (a) to (d) for each of a plurality of detectors configured to detect arrival of individual photons, wherein the plurality of detectors and the detector are included in an image sensor comprising an array of detectors.

18. The method of claim 13, further comprising:

performing (a) to (d) for each of a first plurality of detectors of an image sensor comprising an array including the first plurality of detectors in a first area and a second plurality of detectors in a second area, each of the first plurality of detectors and the second plurality of detectors configured to detect arrival of individual photons, including the detector; and performing (a) to (d) for each of the second plurality of detectors using a second coding matrix $C_1$ having a number of rows $K_1 > K$.

19. A non-transitory computer readable medium containing computer executable instructions that, when executed by a processor, cause the processor to perform a method for determining a depth in a scene, comprising:

(a) detecting, based on a signal from a detector configured to detect arrival of individual photons, a photon arrival;

(b) determining a time bin t associated with the photon arrival, wherein the time bin is in a range from 1 to N where N is a total number of time bins;

(c) updating a compressed histogram comprising K stored values representing bins of the compressed histogram based on K values in a code word represented by an $i^{th}$ column of a coding matrix C having dimension K×N, wherein each column of the coding matrix is different than each other column of the coding matrix, and each column corresponds to a single time bin i; and (d) estimating a depth value based on the K values.

20. The non-transitory computer-readable medium of claim 19, wherein the detector comprises a single photon avalanche diode (SPAD).

\* \* \* \* \*